United States Patent
Toyoda et al.

(10) Patent No.: US 9,551,047 B2
(45) Date of Patent: *Jan. 24, 2017

(54) HIGH-STRENGTH ELECTRIC-RESISTANCE-WELDED STEEL PIPE OF EXCELLENT LONG-TERM SOFTENING RESISTANCE IN INTERMEDIATE TEMPERATURE RANGES

(71) Applicant: JFE Steel Corporation, Tokyo (JP)

(72) Inventors: Shunsuke Toyoda, Kawasaki (JP); Sota Goto, Handa (JP); Takatoshi Okabe, Handa (JP); Tomohiro Inoue, Tokyo (JP)

(73) Assignee: JFE Steel Corporation (JP)

( * ) Notice: Subject to any disclaimer, the term of this patent is extended or adjusted under 35 U.S.C. 154(b) by 49 days.

This patent is subject to a terminal disclaimer.

(21) Appl. No.: 14/410,912

(22) PCT Filed: Jun. 17, 2013

(86) PCT No.: PCT/JP2013/003764
§ 371 (c)(1),
(2) Date: Dec. 23, 2014

(87) PCT Pub. No.: WO2014/002423
PCT Pub. Date: Jan. 3, 2014

(65) Prior Publication Data
US 2015/0203933 A1    Jul. 23, 2015

(30) Foreign Application Priority Data

Jun. 28, 2012 (JP) .................. 2012-145098

(51) Int. Cl.
*C21D 9/08* (2006.01)
*B23K 11/087* (2006.01)
(Continued)

(52) U.S. Cl.
CPC .............. *C21D 9/08* (2013.01); *B21C 37/08* (2013.01); *B23K 11/0873* (2013.01);
(Continued)

(58) Field of Classification Search
CPC .............. Y10T 428/12965; Y10T 428/12972; Y10T 428/12979; Y10T 428/13; B32B 15/011; B32B 15/00; B32B 15/04; B32B 15/043; B32B 15/18; C22C 38/00; C22C 38/14; C22C 38/58; C22C 38/001; C22C 38/002; C22C 38/02; C22C 38/04; C22C 38/06; C22C 38/08; C22C 38/12; C22C 38/16; C22C 38/38; C22C 38/28; C22C 38/26; C22C 38/24; C22C 38/18; C22C 38/22; C22C 38/30

See application file for complete search history.

(56) References Cited

U.S. PATENT DOCUMENTS

| 2011/0079328 | A1* | 4/2011 | Yokoi | C21C 7/0006 |
| | | | | 148/504 |
| 2012/0018028 | A1 | 1/2012 | Shimamura et al. | |

(Continued)

FOREIGN PATENT DOCUMENTS

| CA | 2 679 623 | 11/2008 |
| EP | 2 295 615 | 3/2011 |

(Continued)

OTHER PUBLICATIONS

Machine Translation, Watabe et al., JP 2004-084068, Mar. 2004.*

(Continued)

*Primary Examiner* — Michael E La Villa
(74) *Attorney, Agent, or Firm* — DLA Piper LLP (US)

(57) ABSTRACT

A high strength electric resistance welded steel pipe has a yield strength of 450 MPa or more and excellent resistance to softening for a long period in an intermediate temperature (Continued)

range and a method of manufacturing the steel pipe are provided. The steel pipe has a chemical composition containing, by mass%, C: 0.026% or more and 0.084% or less, Si: 0.10% or more and 0.30% or less, Mn: 0.70% or more and 1.90% or less, Al: 0.01% or more and 0.10% or less, Nb: 0.001% or more and 0.070% or less, V: 0.001% or more and 0.065% or less, Ti: 0.001% or more and 0.033% or less, Ca: 0.0001% or more and 0.0035% or less, in which the condition that Pcm is 0.20 or less is satisfied.

4 Claims, 1 Drawing Sheet

(51) Int. Cl.

| | | |
|---|---|---|
| C22C 38/38 | (2006.01) | |
| C22C 38/28 | (2006.01) | |
| C22C 38/26 | (2006.01) | |
| C22C 38/24 | (2006.01) | |
| C22C 38/16 | (2006.01) | |
| F16L 9/02 | (2006.01) | |
| B21C 37/08 | (2006.01) | |
| B32B 15/01 | (2006.01) | |
| C21D 8/10 | (2006.01) | |
| C21D 9/50 | (2006.01) | |
| C22C 38/14 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/08 | (2006.01) | |
| C22C 38/12 | (2006.01) | |
| C21D 6/00 | (2006.01) | |

(52) U.S. Cl.
CPC ............ *B32B 15/011* (2013.01); *C21D 6/001* (2013.01); *C21D 6/002* (2013.01); *C21D 6/005* (2013.01); *C21D 6/008* (2013.01); *C21D 8/10* (2013.01); *C21D 8/105* (2013.01); *C21D 9/50* (2013.01); *C21D 9/505* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/24* (2013.01); *C22C 38/26* (2013.01); *C22C 38/28* (2013.01); *C22C 38/38* (2013.01); *F16L 9/02* (2013.01); *C21D 2211/005* (2013.01); *Y10T 428/12965* (2015.01); *Y10T 428/12972* (2015.01); *Y10T 428/12979* (2015.01); *Y10T 428/13* (2015.01)

(56) References Cited

U.S. PATENT DOCUMENTS

| | | | |
|---|---|---|---|
| 2012/0241057 | A1 | 9/2012 | Shimamura et al. |
| 2015/0083266 | A1* | 3/2015 | Toyoda .................. B21C 37/08 |
| | | | 138/171 |

FOREIGN PATENT DOCUMENTS

| | | | |
|---|---|---|---|
| EP | 2 837 708 | | 2/2015 |
| JP | 2004-084068 | * | 3/2004 |
| JP | 2004-115871 | | 4/2004 |
| JP | 2005-290546 | | 10/2005 |
| JP | 2006-183133 | | 7/2006 |
| JP | 2007-244797 | | 9/2007 |
| JP | 2007-254797 | | 10/2007 |
| JP | 2008-195991 | | 8/2008 |
| JP | 2010-202976 | | 9/2010 |
| JP | 2011-94231 | | 5/2011 |
| JP | 4741528 | | 5/2011 |

OTHER PUBLICATIONS

Supplementary European Search Report dated Jul. 14, 2015 of corresponding European Application No. 13808665.7.
Chinese Office Action dated Jan. 5, 2016 of corresponding Chinese Application No. 201380034870.4, along with an English translation of the Search Report.
Canadian Office Action dated Jun. 13, 2016, of corresponding Canadian Application No. 2,877,610.

* cited by examiner

HOLDING TIME IN TEMPERATURE RANGE OF 480°C TO 350°C
IN COOLING OF HOT ROLLED STEEL SHEET (h)

TOTAL CONTENT OF Si, Mn, Al, Ca AND Cr CONTAINED IN INCLUSIONS
HAVING AN EQUIVALENT CIRCLE DIAMETER OF 5 μm OR MORE (mass ppm)

HIGH-STRENGTH ELECTRIC-RESISTANCE-WELDED STEEL PIPE OF EXCELLENT LONG-TERM SOFTENING RESISTANCE IN INTERMEDIATE TEMPERATURE RANGES

TECHNICAL FIELD

This disclosure relates to a high strength electric resistance welded steel pipe or tube (hereinafter, a steel pipe or a steel tube is collectively called a steel pipe) which can be suitably used as a steel pipe for a steam line, in particular, to a high strength electric resistance welded steel pipe with excellent resistance to softening for a long period which undergoes only a small amount of decrease in strength (yield strength) after a long period of use in an intermediate temperature range. Here, "high strength" refers to a yield strength YS of 450 MPa or more. In addition, "an intermediate temperature range" refers to 300° C. to 400° C.

BACKGROUND

Nowadays, extra-heavy crude oil called oil sand is receiving a lot of attention due to the development of oil extractive technologies. High-viscosity crude oil such as heavy oil called "bitumen" which is contained in oil sand cannot be recovered from an oil well using an ordinary method. Therefore, an extractive technology called an in-situ recovery method, in which crude oil is recovered by injecting high-temperature vapor having a temperature higher than 300° C. into an oil sand-bearing stratum to decrease the viscosity of the crude oil and by pumping up the dissolved heavy oil component called "bitumen", is being developed. Examples of a method of injecting high-temperature vapor into an oil sand-bearing stratum include a steam injection method. In that method, vapor heated up to a high temperature is transferred through a steam line and injected through an injection pipe.

For a steam line through which vapor is transferred to a vapor injection well, seamless steel pipes or UOE steel pipes manufactured by performing welding using a weld metal have been used from the viewpoint of the reliability of pipes. Since the electric resistance weld zone of an electric resistance welded pipe is poor in terms of reliability, electric resistance welded pipes have not been used for use applications in which a high-temperature strength property is required. Electric resistance welded pipes have been used only for the parts used in near room temperature and for which a high-temperature strength property is not required.

To solve such a problem, for example, Japanese Unexamined Patent Application Publication No. 2006-183133 describes a method of manufacturing a high strength steel pipe for a steam line having excellent toughness in a welded heat-affected zone. The technique described in Japanese Unexamined Patent Application Publication No. 2006-183133 is a technique in which a welded steel pipe is manufactured by heating a steel slab, having a chemical composition containing, by mass %, C: 0.05% to 0.09%, Si: 0.05% to 0.20%, Mn: 1.5% to 2.0%, P: 0.020% or less, S: 0.002% or less, Mo: 0.05% to 0.3%, Nb: 0.005% to 0.05%, Ti: 0.005% to 0.02%, Al: 0.01% to 0.04% and N: 0.004% to 0.006% in which the condition that Ti/N is 2.0 to 4.0 is satisfied, up to a temperature of 1000° C. to 1200° C., by hot-rolling the heated steel slab under conditions such that the cumulative rolling reduction at a temperature of 900° C. or lower is 50% or more and the rolling finishing temperature is 850° C. or lower, by cooling the hot rolled steel sheet down to a temperature of 400° C. to 550° C. by performing accelerated cooling at a cooling rate of 5° C./sec. or more, by forming the obtained steel plate into a pipe shape by performing cold forming and by welding the butt portions of the formed steel plate. According to the technique described in Japanese Unexamined Patent Application Publication No. 2006-183133, it is possible to obtain a high strength welded steel pipe for a steam line having high yield strength and high toughness in a welded heat-affected zone at a temperature of 350° C.

In addition, Japanese Patent No. 4741528 (Japanese Unexamined Patent Application Publication No. 2008-195991), describes a method of manufacturing a steel pipe for a steam transporting line with excellent high-temperature properties. The technique described in Japanese Patent No. 4741528 (Japanese Unexamined Patent Application Publication No. 2008-195991) is a method of manufacturing a high strength steel pipe for a steam transporting line with excellent high-temperature properties, the method including heating a steel slab, having a chemical composition containing, by mass %, C: 0.02% to 0.10%, Si: 0.01% to 0.50%, Mn: 0.5% to 2.0%, Nb: 0.005% to 0.050%, Ti: 0.005% to 0.050%, N: 0.001% to 0.010% and B: 0.0001% to 0.0050%, or, further containing Mo, Cr, V, Ca, REM and so forth, in which the contents of P, S and Al are limited respectively to P: 0.020% or less, S: 0.005% or less and Al: 0.04% or less, and in which the condition that Ti/N is 2.0 to 4.0 is satisfied, up to a temperature of 1000° C. to 1250° C., hot-rolling the heated slab under conditions such that the cumulative rolling reduction in a temperature range of 900° C. or lower is 50% or more and the rolling finishing temperature is 850° C. or lower, cooling the hot rolled steel sheet down to a temperature of 400° C. to 550° C. by performing accelerated cooling at a cooling rate of 5° C./sec. or more, forming the obtained high strength steel plate into a pipe shape and welding the butted portions. According to the technique described in Japanese Patent No. 4741528 (Japanese Unexamined Patent Application Publication No. 2008-195991), it is possible to manufacture a high strength steel pipe having a large diameter for a steam transportation line with excellent high-temperature properties and longtime creep properties.

However, in the techniques described by Japanese Unexamined Patent Application Publication No. 2006-183133 and Japanese Patent No. 4741528 (Japanese Unexamined Patent Application Publication No. 2008-195991), there is an inevitable welded heat-affected zone having a large grain diameter in steel pipes as a result of being heated up to a temperature just below the melting point. Since the high-temperature strength of a welded heat-affected zone decreases due to the presence of such a welded heat-affected zone, it causes concern that there may be a decrease in strength after a long period of use in an intermediate temperature range (300° C. to 400° C.). Therefore, when such steel pipes are used as steel pipes for steam line, it is necessary that a large strength safety ratio be applied, which results in a problem that a vapor temperature and inner pressure may be limited.

It could therefore be helpful to provide a high strength electric resistance welded steel pipe having a high strength of 450 MPa or more in terms of yield strength YS and excellent resistance to softening for a long period in an intermediate temperature range (300° C. to 400° C.) which can be suitably used for a steam transportation line which enables more efficient and economic extraction of heavy oil component called "bitumen" which is dissolved by injecting high-temperature vapor into an oil sand-bearing stratum without limiting a vapor temperature or inner pressure and to provide a method of manufacturing the steel pipe.

SUMMARY

We thus provide:

(1) A high strength electric resistance welded pipe having a chemical composition containing, by mass %, C: 0.025% or more and 0.084% or less, Si: 0.10% or more and 0.30% or less, Mn: 0.70% or more and 1.90% or less, P: 0.018% or less, S: 0.0029% or less, Al: 0.01% or more and 0.10% or less, Nb: 0.001% or more and 0.070% or less, V: 0.001% or more and 0.065% or less, Ti: 0.001% or more and 0.033% or less, Ca: 0.0001% or more and 0.0035% or less, N: 0.0050% or less, 0: 0.0030% or less and the balance being Fe and inevitable impurities, in which the condition that Pcm which is defined by equation (1) below is 0.20 or less is satisfied, having a microstructure in a base metal portion including, in terms of volume percentage, 90% or more of a quasi-polygonal ferrite phase as a main phase and the balance being hard phases other than the quasi-polygonal ferrite phase, in which the quasi-polygonal ferrite phase has an average grain diameter of 10 μm or less, having a microstructure in an electric resistance weld zone including, in terms of volume percentage, 90% or more of a quasi-polygonal ferrite phase as a main phase and the balance being hard phases other than the quasi-polygonal ferrite phase, in which the quasi-polygonal ferrite phase has an average grain diameter of 10 μm or less, having a yield strength YS of 450 MPa or more, and having excellent resistance to softening in a long period in an intermediate temperature range:

$$Pcm=C+Si/30+Mn/20+Cu/20+Ni/60+Cr/20+Mo/15+V/10+5B \quad (1),$$

(where C, Si, Mn, Cu, Ni, Cr, Mo, V and B represent the contents (mass %) of chemical elements respectively represented by the corresponding atomic symbols).

(2) The high strength electric resistance welded pipe according to item (1), in which the pipe has the chemical composition further containing, by mass %, one or more selected from among Cu: 0.001% or more and 0.350% or less, Ni: 0.001% or more and 0.350% or less, Mo: 0.001% or more and 0.350% or less, and Cr: 0.001% or more and 0.350% or less.

(3) The high strength electric resistance welded pipe according to item (1) or (2), in which the total content of Si, Mn, Al, Ca and Cr contained in inclusions having an equivalent circle diameter of 5 gm or more which are present in the electric resistance weld zone is 49 mass ppm or less.

(4) A method of manufacturing a high strength electric resistance welded pipe having a yield strength YS of 450 MPa or more and having excellent resistance to softening in a long period in an intermediate temperature range, in which an electric resistance welded pipe is manufactured by continuously forming a hot rolled steel sheet into an open pipe having an approximately circular cross section using a roll forming method, by performing electric resistance welding in which a vicinity of butt portions of the open pipe are heated up to a temperature equal to or higher than the melting point and welded with pressure using a squeeze roll to make an electric resistance welded pipe having an electric resistance weld zone and by subsequently performing an online heat treatment on the electric resistance welded pipe, the method including heating and soaking a steel material having a chemical composition containing, by mass %, C: 0.025% or more and 0.084% or less, Si: 0.10% or more and 0.30% or less, Mn: 0.70% or more and 1.90% or less, P: 0.018% or less, S: 0.0029% or less, Al: 0.01% or more and 0.10% or less, Nb: 0.001% or more and 0.070% or less, V: 0.001% or more and 0.065% or less, Ti: 0.001% or more and 0.033% or less, Ca: 0.0001% or more and 0.0035% or less, N: 0.0050% or less, 0: 0.0030% or less and the balance being Fe and inevitable impurities, in which the condition that Pcm which is defined by equation (1) below is 0.20 or less is satisfied, at a temperature of higher than 1200° C. and 1280° C. or lower for 90 minutes or more, performing hot rolling under conditions such that the hot rolling reduction in an un-recrystallization temperature range is 20% or more and finish rolling completing temperature is 750° C. or higher, cooling the hot rolled steel sheet, in terms of the temperature of a central portion in the thickness direction, down to a cooling stop temperature of 620° C. or lower at an average cooling rate of 7° C./sec. or more and 299° C./sec. or less in a temperature range of 780° C. to 620° C., coiling the hot rolled steel sheet at a coiling temperature of 595° C. or lower and 475° C. or higher, subsequently performing a heat treatment under conditions such that the coiled hot rolled steel sheet is subjected to a thermal history in which a cumulative holding time in a temperature range of 480° C. to 350° C. is 2 hours or more and 20 hours or less, performing the online heat treatment under conditions such that the whole of the wall thickness (also called pipe thickness) in the vicinity of the electric resistance weld zone is heated up to a temperature of 800° C. or higher and 1150° C. or lower and then cooled, in terms of the temperature of the central portion in the wall thickness direction, down to a cooling stop temperature of 620° C. or lower at an average cooling rate of 7° C./sec. or more and 299° C./sec. or less in a temperature range of 780° C. to 620° C., and further subjected to a thermal history in which a cumulative holding time in a temperature range of 500° C. to 360° C. is 2 seconds or more and 200 seconds or less:

$$Pcm=C+Si/30+Mn/20+Cu/20+Ni/60+Cr/20+Mo/15+V/10+5B \quad (1),$$

(where C, Si, Mn, Cu, Ni, Cr, Mo, V and B represent the contents (mass %) of chemical elements respectively represented by the corresponding atomic symbols.)

(5) The method of manufacturing a high strength electric resistance welded pipe according to item (4), in which the steel material has the chemical composition further containing, by mass %, one or more selected from among Cu: 0.001% or more and 0.350% or less, Ni: 0.001% or more and 0.350% or less, Mo: 0.001% or more and 0.350% or less and Cr: 0.001% or more and 0.350% or less.

(6) The method of manufacturing a high strength electric resistance welded pipe according to item (4) or (5), in which the method includes forming a taper type groove in both end faces in the width direction of the hot rolled steel sheet when finpass forming is performed in the roll forming such that the distance in the thickness direction of the hot rolled steel sheet between the starting position of the taper and the surface of the steel sheet which is to become the outer or inner surface of a steel pipe is 2% to 80% of the thickness of the hot rolled steel sheet.

(7) The method of manufacturing a high strength electric resistance welded pipe according to any one of items (4) to (6), in which the electric resistance welding is performed in an atmosphere in which an oxygen concentration is less than in atmospheric air.

(8) The method of manufacturing a high strength electric resistance welded pipe according to any one of items (4) to (7), in which the total content of Si, Mn, Al, Ca and Cr contained in inclusions having an equivalent circle diameter of 5 μm or more which are present in the electric resistance weld zone is 49 mass ppm or less.

A high strength electric resistance welded pipe having a base metal portion and an electric resistance weld zone which have a high strength of 450 MPa or more in terms of yield strength YS and excellent resistance to softening in a long period in an intermediate temperature range (300° C. to 400° C.) can be stably manufactured and used as a steel pipe for a steam line, which results in a significant industrial effect.

DETAILED DESCRIPTION

Figure 1:
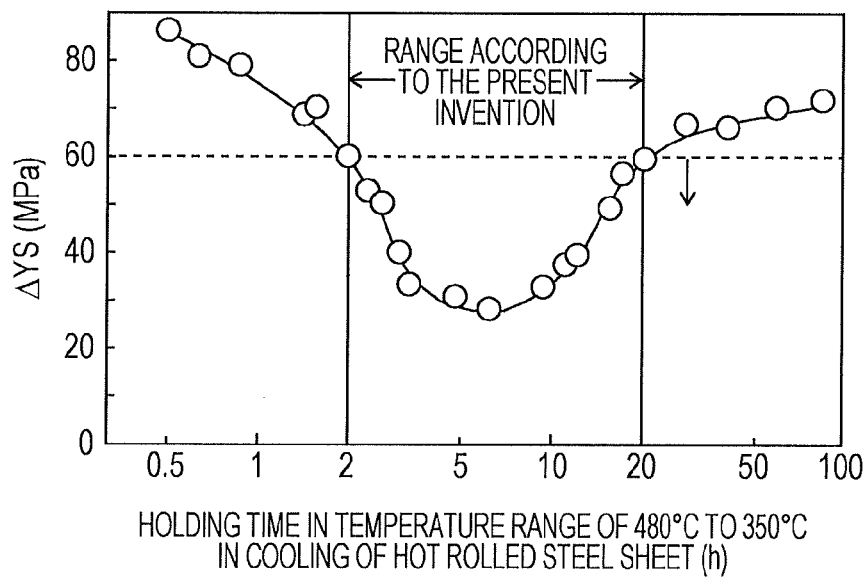
FIG. 1 is a graph illustrating the relationship between ΔYS and a holding time in a temperature range of 480° C. to 350° C. in cooling of hot rolled steel sheets.

"Excellent resistance to softening for a long period in an intermediate temperature range" refers to when a high-temperature tensile test is performed at a temperature of 350° C. before and after a heat treatment at a temperature of 400° C. and for a duration of 2340 hours, the amount ΔYS of change (decrease) in yield strength between before and after the heat treatment is 60 MPa or less. The heat treatment at a temperature of 400° C. and for a duration of 2340 hours corresponds to a heat treatment at a temperature of 350° C. and for a duration of 20 years as converted using a Larson-Miller parameter (refer to F. R. Larson and J. Miller: Trans. ASME, vol. 74 (1952), 99, pp 765 to 775) which is used to assemble creep rupture data collected by performing creep tests at different temperatures. A Larson-Miller parameter is defined by the following equation:

Larson-Miller parameter=$(T+273) \times (C+\log(t))$, (where T: temperature (° C.), t: time (hour) and C: constant=20).

We found that, to increase high-temperature strength and resistance to softening for a long period in an intermediate temperature range, it is important that a microstructure in a base metal portion and an electric resistance weld zone include a quasi-polygonal ferrite phase as a main phase and have a small grain diameter and that the microstructure be stabilized as a result of the stabilization of precipitates.

In addition, we found that, to stabilize precipitates, a holding time at a temperature of 350° C. to 450° C. in a manufacturing process of a raw material for a steel pipe (hot rolled steel sheet) is important. Moreover, we found that, to stabilize precipitates and a microstructure in an electric resistance weld zone, an online heat treatment is necessary and a thermal history in the treatment is important.

In addition, we found that, to increase resistance to softening for a long period in an intermediate temperature range, it is effective to decrease the number of inclusions having a large grain diameter of 5 μm or more in an electric resistance weld zone and that, to realize this effect, it is effective to form a particular groove shape when electric resistance welding is performed.

First, experimental results will be described.

A hot rolled steel sheet having a thickness of 19.1 mm was manufactured by heating and soaking a steel material (continuous casting slab having a thickness of 250 mm) having a chemical composition containing, by mass %, 0.05% C, 0.2% Si, 1.7% Mn, 0.03% Al, 0.05% Nb, 0.05% V, 0.02% Ti, 0.0015% Ca, and 0.20% Cr at a temperature of 1250° C. for 120 minutes and by performing hot rolling including rough rolling and finish rolling under conditions such that the hot rolling reduction in an un-recrystallization temperature range (also called a temperature range lower than the recrystallization temperature) was 50% and a finish rolling completing temperature was 810° C. Immediately after finish rolling had been performed, the hot rolled steel sheet was cooled on a run out table of hot rolling, in terms of the temperature of the central portion in the thickness direction, down to a cooling stop temperature of 500° C. at an average cooling rate of 28° C./sec. at a temperature of 780° C. to 620° C., and coiled into a coil shape at a coiling temperature of 500° C. The coiled hot rolled steel sheet was subjected to a thermal history in which a holding time at a temperature of 350° C. to 480° C. was 0.5 hour to 90 hours.

Using the obtained hot rolled steel sheet as a raw material for a steel pipe, an electric resistance welded pipe (having an outer diameter of 508 mmφ) was manufactured by slitting the hot rolled steel sheet into a specified width, by continuously forming the slit hot rolled steel sheet into an open pipe having an approximately circular cross section using a roll forming method and by performing electric resistance welding in which the vicinity of the butt portions of the open pipe were heated up to a temperature equal to or higher than the melting point and welded with pressure using a squeeze roll.

A test material was cut out of the obtained electric resistance welded pipe and subjected to a heat treatment at a temperature of 400° C. and for a duration of 2340 hours. ASTM E8 round bar type specimens (having a parallel portion of 6.35 mmφ and a GL (gauge length) of 25.4 mm) were cut out of the base metal portions of the test material which had been subjected to the heat treatment and the test material which had not been subjected to the heat treatment so that the tensile direction was the circumferential direction of the pipe. The base metal portion was defined as a portion at a position located 180° from the electric resistance weld zone. Flattening of a steel pipe was not performed when the specimen was cut out of the pipe.

A tensile test was performed to determine yield strength YS such that the test temperature was 350° C. and the specimen was held at the test temperature for 15 minutes before tensile test was performed and that the speed of testing rate of stressing was 0.5%/min when the stress was equal to or less than the YS and 5 mm/min when the stress was more than the YS.

Using the determined values of yield strength YS, the amount ΔYS of decrease in YS between before and after the heat treatment was calculated. The obtained results are illustrated in FIG. 1 in the form of the relationship between ΔYS and a holding time at a temperature of 350° C. to 480° C.

FIG. 1 indicates that ΔYS becomes less than 60 MPa by controlling a holding time at a temperature of 350° C. to 480° C. to be 2 hours to 20 hours, which means that there is an increase in resistance to softening for a long period.

Subsequently, we found that, to increase the resistance to softening for a long period of an electric resistance weld zone, it is particularly effective to decrease the number of inclusions having a large grain diameter in an electric resistance weld zone. Test materials which were cut out of electric resistance welded pipes which were manufactured using various conditions of electric resistance welding and groove shapes and which were subjected to an online heat treatment were subjected to a heat treatment at a temperature of 400° C. and for a duration of 2340 hours. ASTM E8 round bar type specimens (having a parallel portion of 6.35 mmϕ and a GL of 25.4 mm) were cut out of the electric resistance weld zone of the test material which had been subjected to the heat treatment and the test material which had not been subjected to the heat treatment so that the tensile direction was the circumferential direction of the pipe. The round bar type specimen was cut out of the electric resistance weld zone so that the seam of the electric resistance weld zone was located at the center of the parallel portion of the specimen. Flattening of a steel pipe was not performed when the specimen was cut out of the pipe. A tensile test was performed to determine yield strength YS in a manner such that the test temperature was 350° C. and the specimen was held at the test temperature for 15 minutes before tensile test was performed and that the speed of testing rate of stressing was 0.5%/min when the stress was equal to or less than the YS and 5 mm/min when the stress was more than the YS. Using the determined values of yield strength YS, the amount ΔYS of decrease in YS between before and after the heat treatment was calculated.

Moreover, a plate type specimen having a width of 2 mm (having a width of 2 mm, thickness equal to the whole thickness and a length equal to the whole thickness) and having the center of the electric resistance weld zone positioned at the center of the specimen was cut out of the electric resistance weld zone of the obtained electric resistance welded pipe. By performing electrolytic extraction on this plate type specimen in an electrolytic solution (10% AA-based electrolytic solution: 10% acetylacetone, 1% tetramethylammonium chloride, and methanol), by collecting obtained extraction residue using a filter mesh (having a hole diameter of 5 μm), by determining the respective contents (mass ppm) of Si, Mn, Al, Ca and Cr in the extraction residue using inductively coupled plasma atomic emission spectroscopy, and by calculating the total value of the contents, the total value was defined as the number of inclusions having a large equivalent circle diameter of 5 μm or more in the electric resistance weld zone. "Equivalent circle diameter" means the diameter of a circle having the same area as the area of an inclusion.

Figure 2:
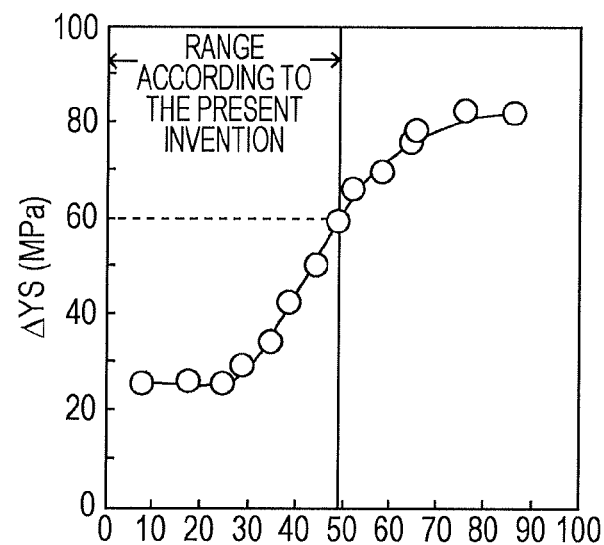
FIG. 2 is a graph illustrating the relationship between ΔYS and the total content of Si, Mn, Al and Ca contained in inclusions having an equivalent circle diameter of 5 μm or more which are present in an electric resistance weld zone.

The obtained results are illustrated in FIG. 2 in the form of the relationship between ΔYS and the total value of the contents (mass ppm) of Si, Mn, Al, Ca and Cr contained in inclusions having an equivalent circle diameter of 5 μm or more in an electric resistance weld zone.

FIG. 2 indicates that ΔYS becomes less than 60 MPa when the total content of Si, Mn, Al, Ca and Cr contained in inclusions having an equivalent circle diameter of 5 μm or more is 49 mass ppm or less, which means that there is an increase in resistance to softening for a long period. In addition, we also found that there is a decrease in the total content of Si, Mn, Al, Ca and Cr contained in inclusions having an equivalent circle diameter of 5 μm or more by forming a taper type groove in the cross sections of the butt portions of an open pipe.

First, reasons for limitations on the chemical composition of the high strength electric resistance welded steel pipe will be described. Hereinafter, mass % used when describing a chemical composition is simply represented by %.

C: 0.025% or More and 0.084% or Less

C is effective to increase the strength of a steel pipe as a result of contributing to the formation of hard phases such as a pearlite phase, a quasi-pearlite phase, a cementite phase, a bainite phase and a martensite phase. To realize this effect and achieve the desired yield strength YS of 400 MPa or more, it is necessary that the C content be 0.025% or more. On the other hand, when the C content is more than 0.084%, since there is an increase in the amount of hard phases in a base metal portion and an electric resistance weld zone, there is a deterioration in resistance to softening in a long period. Therefore, the C content is 0.025% or more and 0.084% or less, preferably 0.030% or more and 0.060% or less. In addition to the effect described above, C has an influence on the formation of oxides in an electric resistance weld zone through a decrease in the solidification point, a CO forming reaction with $O_2$ and so forth when electric resistance welding is performed.

Si: 0.10% or More and 0.30% or Less

Si contributes to an increase in the strength of a steel pipe through solute strengthening. In addition, since Si has a larger affinity for O than Fe has, Si forms eutectic oxides having a high viscosity together with Mn oxides when electric resistance welding is performed. When the Si content is less than 0.10%, since the melting point of the oxides becomes higher than a liquid steel temperature due to an increase in Mn concentration in the eutectic oxides, Mn is likely to be retained in an electric resistance weld zone in the form of oxides when electric resistance welding is performed. Therefore, since there is an increase in Mn content in inclusions having an equivalent circle diameter of 5 μm or more present in an electric resistance weld zone, the total content of Si, Mn, Al, Ca and Cr becomes more than 49 mass ppm. As a result, there is a deterioration in the resistance to softening for a long period of an electric resistance weld zone. On the other hand, when the Si content is more than 0.30%, since the melting point of the oxides becomes higher than a liquid steel temperature due to an increase in Si content in the eutectic oxides when electric resistance welding is performed, there is an increase in the absolute amount of oxides and Si is likely to be retained in an electric resistance weld zone in the form of oxides. Therefore, since there is an increase in Si and Mn content in inclusions having an equivalent circle diameter of 5 μm or more present in an electric resistance weld zone, the total content of Si, Mn, Al, Ca and Cr becomes more than 49 mass ppm. As a result, there is a deterioration in the resistance to softening for a long period of an electric resistance weld zone. Therefore, the Si content is 0.10% or more and 0.30% or less, preferably 0.15% or more and 0.25% or less.

Mn: 0.70% or More and 1.90% or Less

Mn contributes to an increase in the strength of a steel pipe through solute strengthening and transformation structure strength. In addition, since Mn has a larger affinity for O than Fe has, Mn forms eutectic oxides having a high viscosity together with Si oxides when electric resistance welding is performed. When the Mn content is less than 0.70%, since the melting point of the oxides becomes higher than a liquid steel temperature due to an increase in Si concentration in the eutectic oxides when electric resistance welding is performed, Si is likely to be retained in an electric resistance weld zone in the form of oxides. Therefore, since there is an increase in Si content in inclusions having an equivalent circle diameter of 5 μm or more which are present in an electric resistance weld zone, the total content of Si, Mn, Al, Ca and Cr becomes more than 49 mass ppm. As a result, there is a deterioration in the resistance to softening for a long period of an electric resistance weld zone. On the other hand, when the Mn content is more than 1.90%, since the melting point of the oxides becomes higher than a liquid steel temperature due to an increase in Mn content in the eutectic oxides when electric resistance welding is performed, there is an increase in the absolute amount of oxides and Mn is likely to be retained in an electric resistance weld zone in the form of oxides. Therefore, the total content of Si, Mn, Al, Ca and Cr contained in inclusions having an equivalent circle diameter of 5 μm or more becomes more than 49 mass ppm. As a result, there is a deterioration in the resistance to softening for a long period of an electric resistance weld zone. In addition, when the Mn content is more than 1.90%, since there is an increase in the amount of hard phases in a base metal portion and an electric resistance weld zone, there is a deterioration in resistance to softening for a long period.

Therefore, the Mn content is 0.70% or more and 1.90% or less, preferably 0.85% or more and 1.85% or less.

P: 0.018% or Less

Since P deteriorations the resistance to softening for a long period of a base metal portion and an electric resistance weld zone as a result of co-segregation with Mn, it is preferable that the P content be as small as possible, but it is allowable if the P content is 0.018% or less. Therefore, the P content is 0.018% or less. An excessive decrease in P content causes an increase in refining cost. It is preferable that the P content be 0.001% or more from the viewpoint of the economic efficiency of a steelmaking process.

S: 0.0029% or Less

Since S deteriorates ductility and toughness as a result of combining with Mn to form MnS and being present in steel in the form of inclusions, it is preferable that the S content be as small as possible. In particular, when the S content is more than 0.0029%, there is a deterioration in resistance to softening for a long period. Therefore, the S content is set to be 0.0029% or less. In addition, an excessive decrease in S content causes an increase in refining cost. It is preferable that the S content be 0.0001% or more from the viewpoint of the economic efficiency of a steelmaking process.

Al: 0.01% or More and 0.10% or Less

Al functions as a deoxidation agent in a steelmaking process. In addition, Since Al suppresses an increase in y grain diameter as a result of combining with N to form AN and precipitating, Al contributes to an improvement in the low-temperature toughness of steel. To realize this effect, it is necessary that the Al content be 0.01% or more. When the Al content is less than 0.01%, since there is a deterioration in the cleanness of steel due to a sufficient deoxidation effect not being achieved in a steelmaking process, there is an increase in the amount of oxides in an electric resistance weld zone, which results in the total content of Si, Mn, Al, Ca and Cr contained in inclusions having an equivalent circle diameter of 5 μm or more becoming more than 49 ppm. As a result, there is a deterioration in resistance to softening for a long period. In addition, since Al has a much larger affinity for O than Si and Mn have, Al forms oxides in the form of solid solutions in Mn—Si eutectic oxides such as $2MnO.SiO_2$ (Tephroite). On the other hand, when the Al content is more than 0.10%, since the melting point of the oxides becomes higher than a liquid steel temperature due to an increase in Al concentration in the eutectic oxides when electric resistance welding is performed, Al is likely to be retained in an electric resistance weld zone in the form of oxides. Therefore, since there is an increase in the contents of Si, Mn and Al in inclusions which are present in an electric resistance weld zone, the total content of Si, Mn, Al, Ca and Cr in inclusions having an equivalent circle diameter of 5 μm or more becomes more than 49 ppm. As a result, there is a deterioration in the resistance to softening for a long period. Therefore, the Al content is 0.01% or more and 0.10% or less, preferably 0.02% or more and 0.08% or less.

Nb: 0.001% or More and 0.070% or Less

Nb is effective in increasing the strength of a steel pipe through precipitation strengthening as a result of precipitating mainly in the form of carbides. To realize this effect, it is necessary that the Nb content be 0.001% or more. On the other hand, when the Nb content is more than 0.070%, non-solid solution Nb carbonitrides having a large grain diameter are retained, which results in a deterioration in resistance to softening for a long period. Therefore, the Nb content is 0.001% or more and 0.070% or less, preferably 0.051% or more and 0.065% or less.

V: 0.001% or More and 0.065% or Less

V is, like Nb, effective to increase the strength of a steel pipe through precipitation strengthening as a result of precipitating mainly in the form of carbides. To realize this effect, it is necessary that the V content be 0.001% or more. On the other hand, when the V content is more than 0.065%, non-solid solution V carbonitrides having a large grain diameter are retained, which results in a deterioration in resistance to softening for a long period. Therefore, the V content is 0.001% or more and 0.065% or less, preferably 0.005% or more and 0.050% or less.

Ti: 0.001% or More and 0.033% or Less

Ti is, like Nb and V, effective to increase the strength of a steel pipe through precipitation strengthening as a result of precipitating mainly in the form of carbides. To realize this effect, it is necessary that the Ti content be 0.001% or more. On the other hand, in the case where the Ti content is more than 0.033%, non-solid solution Ti carbonitrides having a large grain diameter are retained, which results in a deterioration in resistance to softening for a long period. Therefore, the Ti content is 0.001% or more and 0.033% or less, preferably 0.005% or more and 0.020% or less.

Ca: 0.0001% or More and 0.0035% or Less

Since Ca is effective for morphological control of spheroidizing sulfides in steel, Ca is effective to improve toughness and HIC resistance (Hydrogen Induced Cracking resistance) in the vicinity of the electric resistance weld zone of a steel pipe. To realize this effect, it is necessary that the Ca content be 0.0001% or more. On the other hand, when the Ca content is more than 0.0035% excessively, since the melting point of the oxides becomes higher than a liquid steel temperature due to an increase in Ca content in the oxides, there is an increase in the amount of oxides and Ca is likely to be retained in an electric resistance weld zone in the form of oxides when electric resistance welding is performed. Therefore, since there is an increase in the Ca content in inclusions which are present in an electric resistance weld zone, the total content of Si, Mn, Al, Ca and Cr contained in inclusions having an equivalent circle diameter of 5 μm or more which are present in an electric resistance weld zone becomes more than 49 mass ppm. As a result, there is a deterioration in the resistance to softening for a long period of an electric resistance weld zone. Therefore, the Ca content is 0.0001% or more and 0.0035% or less, preferably 0.0002% or more and 0.0028% or less.

N: 0.0050% or Less

N precipitates in the form of Ti(N,C) as a result of combining with Ti which is a carbonitride forming element, or N is retained in the form of solute N. When the N content is more than 0.0050%, since there is an increase in the amounts of Ti(N,C) and solute N, there is a deterioration in resistance to softening in a long period. Therefore, the N content is 0.0050% or less, preferably 0.0040% or less.

O: 0.0030% or Less

O deteriorates ductility and toughness as a result of being present in steel mainly in the form of oxide-based inclusions.

When the O content is more than 0.0030%, since the amount of inclusions becomes excessively large, there is, in particular, a significant deterioration in resistance to softening in a long period. Therefore, the O content is 0.0030% or less.

Although the chemical components described above are the basic components, in addition to the basic chemical composition described above, one or more selected from among Cu: 0.001% or more and 0.350% or less, Ni: 0.001% or more and 0.350% or less, Mo: 0.001% or more and 0.350% or less and Cr: 0.001% or more and 0.350% or less may be added.

Since Cu, Ni, Mo and Cr are all chemical elements which contribute to an increase in hardenability, one or more of these chemical elements may be added as needed in order to achieve the desired high strength.

Cu: 0.001% or More and 0.350% or Less

Since Cu is a chemical element which increases hardenability, it is preferable that Cu be added to increase the strength of, in particular, thick-walled sheets. To realize this effect, it is preferable that the Cu content be 0.001% or more. On the other hand, when the Cu content is more than 0.350%, since the effect becomes saturated, an effect corresponding to the content cannot be expected. Therefore, when Cu is added, it is preferable that the Cu content be 0.001% or more and 0.350% or less, more preferably 0.05% or more and 0.290% or less.

Ni: 0.001% or More and 0.350% or Less

Since Ni is, like Cu, a chemical element which increases hardenability, it is preferable that Cu be added to increase the strength of, in particular, thick-walled sheets. To realize this effect, it is preferable that the Ni content be 0.001% or more. On the other hand, when the Ni content is more than 0.350%, since the effect becomes saturated, an effect corresponding to the content cannot be expected. Therefore, when Ni is added, it is preferable that the Ni content be 0.001% or more and 0.350% or less, more preferably 0.05% or more and 0.290% or less.

Mo: 0.001% or More and 0.350% or Less

Since Mo is, like Ni and Cu, a chemical element which increases hardenability, it is preferable that Cu be added to increase the strength of, in particular, thick-walled sheets. To realize this effect, it is preferable that the Mo content be 0.001% or more. On the other hand, when the Mo content is more than 0.350%, since the effect becomes saturated, an effect corresponding to the content cannot be expected. Therefore, when Mo is added, it is preferable that the Mo content be 0.001% or more and 0.350% or less, more preferably 0.05% or more and 0.290% or less.

Cr: 0.001% or More and 0.700% or Less

Since Cr is a chemical element which increases hardenability, it is preferable that Cr be added to increase the strength of, in particular, thick-walled sheets. In addition, Cr is, like Mn, effective to achieve the desired high strength and microstructure for a steel pipe through transformation toughening. To realize these effects, it is preferable that the Cr content be 0.001% or more. In addition, since Cr has a larger affinity for O than Fe has, there is an increase in Cr concentration in oxides when electric resistance welding is performed when the Cr content is more than 0.700%, which results in the melting point of the oxides becoming higher than the liquid steel temperature. Therefore, there is an increase in the amount of oxides and Cr is likely to be retained in an electric resistance weld zone in the form of oxides. Therefore, since there is an increase in the amount of inclusions which are present in an electric resistance weld zone the total content of Si, Mn, Al, Ca and Cr contained in inclusions having an equivalent circle diameter of 5 μm or more in an electric resistance weld zone becomes more than 49 mass ppm. Therefore, in the case where Cr is added, it is preferable that the Cr content be 0.001% or more and 0.700% or less, more preferably 0.02% or more and 0.290% or less.

Moreover, the high strength electric resistance welded steel pipe has a chemical composition containing the chemical components described above in the ranges described above, and the chemical composition is controlled so that the condition that Pcm which is defined by equation (1) below is 0.20 or less is satisfied:

$$Pcm=C+Si/30+Mn/20+Cu/20+Ni/60+Cr/20+Mo/15+V/10+5B \qquad (1),$$

(where C, Si, Mn, Cu, Ni, Cr, Mo, V and B: the contents (mass %) of chemical elements respectively represented by the corresponding atomic symbols).

Pcm is an index having an influence on formation of a microstructure in an electric resistance weld zone when rapid cooling is performed, and Pcm is set to be 0.20 or less, preferably 0.17 or less.

When Pcm is more than 0.20, it is difficult to form a microstructure mainly including a quasi-polygonal ferrite phase as a main phase in an electric resistance weld zone. Therefore, there is a deterioration in the resistance to softening for a long period of an electric resistance weld zone. In addition, although there is no particular limitation on the lower limit of Pcm, it is preferable that Pcm be controlled to be 0.07 or more to stably achieve a YS of 450 MPa or more.

Subsequently, reasons for limitations on the microstructure of the high strength electric resistance welded steel pipe will be described.

Both of the base metal portion and electric resistance weld zone of the high strength electric resistance welded steel pipe have a microstructure including, in terms of volume percentage, 90% or more of a quasi-polygonal ferrite phase as a main phase and the balance being hard phases other than a quasi-polygonal ferrite phase, in which the average grain diameter of the main phases such as a quasi-polygonal ferrite phase is 10 μm or less. Second phases other than the main phase constitute, in terms of volume percentage, 10% or less of the microstructure and are hard phases such as a pearlite phase, a quasi-pearlite phase, a cementite phase, a bainite phase and a martensite phase. When the hard phases which are the second phases constitute more than 10% of the microstructure, since there is an excessive increase in strength, there is a deterioration in resistance to softening for a long period.

"Quasi-polygonal ferrite phase" means a microstructure which has a nondimensional shape formed at a temperature of lower than about 600° C. and 400° C. or higher, which is a lower range in which a polygonal ferrite phase is formed, by growing across prior-austenite boundaries and in which most of transformation strain is recovered. This microstructure is the same as "Quasi-polygonal Ferrite α q" which is described in "Atlas for Bainitic Microstructures Vol.-1" (edited by Bainite Research Committee, Society on Basic Research, The Iron and Steel Institute of Japan, and published by The Iron and Steel Institute of Japan (1992.6.29); see p. 4).

By forming a microstructure including a quasi-polygonal ferrite phase having an average grain diameter of 10 μm or less as main phase in an amount of 90% or more in terms of volume percentage, it is possible to manufacture an electric resistance welded steel pipe having a high strength of 450 MPa or more in terms of yield strength YS, excellent resistance to softening in a long period and an excellent creep rupture property. When there is a decrease in the fraction of a quasi-polygonal ferrite phase and a phase other than a quasi-polygonal ferrite phase such as a bainite phase becomes a main phase, since there is an excessive increase in strength, there is a deterioration in resistance to softening for a long period. In addition, when a polygonal ferrite phase becomes a main phase, since there is a decrease in strength, the desired high strength cannot be achieved and there is a deterioration in resistance to softening in a long period. In addition, when the average grain diameter is more than 10 μm, there is a decrease in strength in an intermediate temperature range.

Subsequently, a method of manufacturing the electric resistance welded pipe will be described.

An electric resistance welded pipe is manufactured by continuously forming a hot rolled steel sheet into an open pipe having an approximately circular cross section using a roll forming method and by performing common electric resistance welding in which the vicinity of the butt portions of the open pipe are heated up to a temperature equal to or higher than the melting point and welded with pressure using a squeeze roll.

The hot rolled steel sheet which becomes the raw material for a steel pipe is manufactured using the steel material having the chemical composition described above as a starting material. Although there is no particular limitation on what method is used to manufacture the steel material, it is preferable that the steel material be smelted using, for example, a common converter and be cast into, for example, a slab using a common continuous casting process.

A raw material for a steel pipe is manufactured by heating and soaking a steel material having the chemical composition, by performing hot rolling on the heated steel material and by coiling the hot rolled steel material into a coil shape to manufacture a hot rolled steel sheet.

Heating Temperature: Higher Than 1200° C. and 1280° C. or Lower and Holding Time: 90 Minutes or More A heating temperature has an influence on the strength and resistance to softening for a long period of a base metal portion. When the heating temperature is 1200° C. or lower, since precipitation strengthening elements such as Nb, V and Ti do not reform solid solutions and are retained in the form of precipitates having a large grain diameter, it is difficult to achieve the desired high strength of 450 MPa or more in terms of YS. In addition, when precipitates having a large grain diameter is retained without forming solid solutions, there is a deterioration in the resistance to softening for a long period of a base metal portion. On the other hand, when the heating temperature is higher than 1280° C., there is a deterioration in resistance to softening for a long period due to an increase in grain diameter in a microstructure.

In addition, when the holding time is less than 90 minutes, precipitation strengthening elements such as Nb, V and Ti do not reform solid solutions and are retained in the form of precipitates having a large grain diameter, in particular, in the central portion in the thickness direction. Precipitates having a large grain diameter deterioration the resistance to softening for a long period. Therefore, the heating temperature is higher than 1200° C. and 1280° C. or lower, and the holding time is 90 minutes or more.

The heated and soaked steel material is made into a hot rolled steel sheet by performing hot rolling including rough rolling and finish rolling.

There is no limitation on rough rolling conditions as long as a sheet bar having specified size and shape can be manufactured. After rough rolling has been performed, finish rolling is performed. Finishing rolling is performed under conditions such that the hot rolling reduction in an un-recrystallization temperature range is 20% or more and the finish rolling completing temperature is 750° C. or higher.

Hot Rolling Reduction in an Un-Crystallization Temperature Range: 20% or More

When the hot rolling reduction in an un-crystallization temperature range is less than 20%, since an average grain diameter in the microstructure of the obtained hot rolled steel sheet becomes more than 10 μm, there is a deterioration in the resistance to softening for a long period of a base metal portion. Although there is no particular limitation on the upper limit of the hot rolling reduction, it is preferable that the upper limit be 95% or less from the viewpoint of a load on a rolling mill.

Finish Rolling Completing Temperature: 750° C. or Higher

When the finish rolling completing temperature is lower than 750° C., since rolling strain is retained, there is a deterioration in resistance to softening for a long period even after subsequent cooling has been performed. Therefore, the finish rolling completing temperature is set to be 750° C. or higher.

The hot rolled steel sheet which has been subjected to finish rolling is cooled on a run out table of hot rolling. Cooling after rolling is performed, in terms of the temperature of a central portion in the thickness direction, down to a cooling stop temperature of 620° C. or lower at an average cooling rate of 7° C./sec. or more and 299° C./sec. or less in a temperature range of 780° C. to 620° C.

Average Cooling Rate at a Temperature of 780° C. to 620° C. in Terms of the Temperature of the Central Portion in the Thickness Direction: 7° C./Sec. or More and 299° C./Sec. or Less When the average cooling rate at a temperature of 780° C. to 620° C. is less than 7° C./sec, since a polygonal ferrite having a large grain diameter of more than 10 μm is formed, the desired microstructure in a base metal portion cannot be achieved. Therefore, the desired high strength of 450 MPa or more in terms of YS cannot be achieved, and there is a deterioration in resistance to softening in a long period. On the other hand, when the average cooling rate is more than 299° C./sec., since the fraction of a quasi-polygonal ferrite phase becomes less than 90%, there is a deterioration in resistance to softening for a long period due to an increase in strength. Therefore, cooling after rolling should be performed at an average cooling rate of 7° C./sec. or more and 299° C./sec. or less in a temperature range of 780° C. to 620° C. in terms of the temperature of the central portion in the thickness direction.

In addition, in cooling after rolling, it is preferable that difference between the cooling rates of the central part in the thickness direction and any other portion in the thickness direction other than the outermost portions within 0.2 mm from the surfaces be within 5° C./sec. when latter is smaller than the former and within 20° C./sec. when the latter is larger than the former.

Cooling Stop Temperature After Rolling has Been Performed: 620° C. or Lower

Cooling after rolling has been performed is performed at a cooling rate described above down to a cooling stop temperature of 620° C. or lower. When the cooling stop temperature is higher than 620° C., the desired microstructure including a quasi-polygonal ferrite phase as a main phase cannot be achieved due to an excessively high cooling stop temperature. Therefore, the cooling stop temperature after rolling is 620° C. or lower, preferably 595° C. or lower and 475° C. or higher.

After cooling after rolling has been stopped, the hot rolled steel sheet is coiled at a coiling temperature of 595° C. or lower and 475° C. or higher.

Coiling Temperature: 595° C. and Lower and 475° C. or Higher

When the coiling temperature is lower than 475° C., since the coiling temperature is excessively low, there is a deterioration in resistance to softening in a long period due to formation of a microstructure including a bainite phase as a main phase. Therefore, the coiling temperature is 475° C. or higher. In addition, when the coiling temperature is higher than 595° C., since the coiling temperature is excessively high, the desired microstructure cannot be achieved. Therefore, the coiling temperature is 595° C. or lower and 475° C. or higher.

The coiled hot rolled steel sheet is subsequently subjected to a thermal history in which a holding time at a temperature of 480° C. to 350° C. is 2 hours or more and 20 hours or less.

Cumulative Holding Time at a Temperature of 480° C. to 350° C.: 2 Hours or More and 20 Hours or Less The control of a thermal history at a temperature of 480° C. to 350° C. is an important factor to achieve the desired properties, in particular, excellent resistance to softening for a long period in an intermediate temperature range for a base metal. By holding the temperature of the central portion in the thickness direction at a temperature of 480° C. to 350° C. for a specified time, since precipitates, a dislocation substructure, a microstructure and the like are stabilized, there is a decrease in the degree of changes in these factors even when the steel sheet is held at an intermediate temperature for a long time afterward. When the cumulative holding time at a temperature of 480° C. to 350° C. is less than 2 hours, since stabilization of a microstructure is insufficient, there is a decrease in high-temperature strength and there is a deterioration in resistance to softening for a long period due to changes in precipitates, a dislocation substructure, a microstructure and the like in the case where the steel sheet is held in an intermediate temperature range for a long time. On the other hand, when the cumulative holding time at a temperature of 480° C. to 350° C. is more than 20 hours, there is a decrease in high-temperature strength of a base metal. Therefore, the cumulative holding time at a temperature of 480° C. to 350° C. is 2 hours or more and 20 hours or less, preferably 3 hours or more and 12 hours or less. It is preferable that the cumulative holding time at a temperature of 480° C. to 350° C. is controlled through the control of a coiling temperature and the cooling conditions of a coil. After a thermal history at a temperature of 480° C. to 350° C. has been controlled, the steel sheet stands to be cooled.

Subsequently, using the obtained hot rolled steel sheet as a raw material for a steel pipe, an electric resistance welded pipe is manufactured by continuously forming the hot rolled steel sheet into an open pipe having an approximately circular cross section using a roll forming method and by performing electric resistance welding in which the vicinity of the butt portions of the open pipe are heated up to a temperature equal to or higher than the melting point and welded with pressure using a squeeze roll.

It is preferable that a taper type groove be formed in both end faces in the width direction of the hot rolled steel sheet (end faces of the butt portions of the open pipe) when finpass forming is performed in the continuous roll forming. It is preferable that the taper type groove be formed so that the distance in the thickness direction of the steel sheet between the starting position of the taper and the surface of the steel sheet which is to become the outer or inner surface of a steel pipe is 2% to 80% of the thickness of the steel sheet. With this method, since the discharge of inclusions in an electric resistance weld zone is promoted and there is a decrease in the amount of inclusions, the total content of Si, Mn, Al, Ca and Cr contained in inclusions having an equivalent circle diameter of 5 µm or more which are present in the electric resistance weld zone is decreased by about 10 ppm. It is more preferable that the distance between the starting position of the taper and the surface of the steel sheet be 5% to 40%, further more preferably 10% to 35%. In addition, taper shape is not limited to a straight line, and curves may be used as desired.

In addition, electric resistance welding may be performed using any of known electric resistance welding methods. In addition, although electric resistance welding is usually performed in atmospheric air, electric resistance welding may be performed in an atmosphere in which oxygen concentration is decreased by performing atmospheric control. When atmospheric control is performed, it is preferable that the oxygen concentration be 0.5 mass % or less, more preferably 0.1 mass % or less.

Examples of methods of atmospheric control include one in which an area in which electric resistance welding is performed is sealed in a box type structure and a non-oxidizing gas is fed into the structure. There may conversely be an increase in oxygen concentration due to the surrounding atmosphere (atmospheric air) being took into the structure when a non-oxidizing gas is blown into the structure. Therefore, it is preferable that a non-oxidizing gas be blown into the structure using a gas atomization nozzle having a multilayer structure such as a three-layered structure.

The electric resistance weld zone of the obtained electric resistance welded steel pipe is subjected to a heat treatment in which heating and cooling are performed online.

It is preferable that this heat treatment be performed using high-frequency dielectric heating equipment which is equipped on line and with which only the vicinity of an electric resistance weld zone can be heated. In addition, it is preferable that cooling be performed using a cooling apparatus which is placed above an electric resistance weld zone to be cooled and which has plural cooling heads having plural nozzles to control a cooling rate. This heat treatment is performed by heating the whole of the wall thickness in the vicinity of an electric resistance weld zone up to a temperature in the range of 800° C. or higher and 1150° C. or lower, by performing cooling, in terms of the temperature of the central portion in the thickness direction, down to a cooling stop temperature of 620° C. or lower at an average cooling rate of 7° C./sec. or more and 299° C./sec. or less at a temperature of 780° C. to 620° C., and by further performing a heat treatment under conditions such that the central portion in the thickness direction is subjected to a thermal history in which a cumulative holding time at a temperature of 500° C. to 360° C. is 2 seconds or more and 200 seconds or less. In addition, to control the cumulative holding time at the temperature of 500° C. to 360° C. to be in the range described above, it is preferable that slow cooling be performed at this temperature or that a treatment (tempering treatment) in which heating is performed up to a temperature of 500° C. to 360° C. be performed.

By performing the heat treatment described above, an electric resistance weld zone has a microstructure including, in terms of volume percentage, 90% or more of a quasi-polygonal ferrite phase having a small average grain diameter of 10 µm or less and the balance being hard phases such as a pearlite phase, a high strength of 450 MPa in terms of yield strength YS, excellent resistance to softening for a long period and an excellent creep rupture property. In particular, the resistance to softening for a long period of an electric resistance weld zone is strongly influenced by oxides and a microstructure in an electric resistance weld zone.

When the heating temperature is lower than 800° C., since hard phases are retained in the state as formed by performing electric resistance welding, the desired toughness cannot be achieved. On the other hand, when the heating temperature is higher than 1150° C., since there is an increase in grain diameter, the desired toughness cannot be achieved.

In the cooling process after heating has been performed, when the average cooling rate at a temperature of 780° C. to 620° C. in terms of the temperature of the central portion in the thickness direction is less than 7° C./sec., since an electric resistance weld zone has a microstructure mainly including a polygonal ferrite phase having a large grain diameter due to an increase in the grain diameter of a microstructure in an electric resistance weld zone, a high strength of 450 MPa or more in terms of yield strength YS cannot be achieved and there is a deterioration in resistance to softening for a long period. On the other hand, when the average cooling rate is more than 229° C./sec., since the fraction of a quasi-polygonal ferrite phase becomes less than 90%, there is an increase in strength and there is a deterioration in resistance to softening in a long period.

In addition, the cooling stop temperature is set to be 620° C. or lower. When the cooling stop temperature is higher than 620° C., a microstructure mainly includes a polygonal ferrite.

In addition, regarding resistance to softening for a long period of an electric resistance weld zone in an intermediate temperature range, by controlling a thermal history at a temperature of 500° C. to 360° C. in the online heat treatment after electric resistance welding has been performed, excellent property can be realized because precipitates, dislocation density, a microstructure and so forth are stabilized. When the cumulative holding time at a temperature of 500° C. to 360° C. is less than 2 seconds, since precipitates, dislocation substructure, a microstructure and so forth are changed when the steel pipe is held in an intermediate temperature range for a long time, there is a decrease in high-temperature strength and there is a deterioration in resistance to softening for a long period. On the other hand, when the cumulative holding time is more than 200 seconds, there is a decrease in the high-temperature strength of an electric resistance weld zone. Therefore, the cumulative holding time at a temperature of 500° C. to 360° C. is set to be 2 seconds or more and 200 seconds or less, preferably 3 seconds or more and 120 seconds or less.

Our pipes and methods will be further described on the basis of examples hereafter.

EXAMPLES

Example 1

By heating steel materials (slabs having a thickness of 250 mm) having chemical compositions given in Table 1 at a temperature of 1230° C. given in Table 2 for 110 minutes and by subsequently performing hot rolling including rough rolling and finish rolling in which hot rolling reduction in a non-recrystallization temperature range (temperature range lower than a recrystallization temperature) and a finish rolling completing temperature were controlled under the conditions given in Table 2, hot rolled steel sheets having a thickness of 19.1 mm were manufactured. In addition, as the steel materials, slabs which were prepared by smelting molten steels having the chemical compositions given in Table 1 using a converter and by casting the molten steels into slabs having a thickness of 250 mm using a continuous casting method were used.

Immediately after finish rolling had been performed, the hot rolled steel sheets were subjected to cooling under the conditions given in Table 2 on a run out table of hot rolling and then coiled. The coiled hot rolled steel sheets were further subjected to a thermal history in which a holding time at a temperature of 350° C. to 480° C. was controlled under the conditions given in Table 2.

Using the obtained hot rolled steel sheets as raw materials for steel pipes, by slitting the materials into a specified width, by continuously forming the slit hot rolled steel sheets into open pipes having an approximately circular cross section by performing roll forming, and by performing electric resistance welding in which the vicinity of the butted portions of the open pipes were heated up to a temperature higher than the melting point and welded by pressure using a squeeze roll, electric resistance steel pipes (having an outer diameter of 609.6 mmφ) were manufactured.

Subsequently, the electric resistance weld zones of the obtained electric resistance welded steel pipes were subjected to an online heat treatment in which heating and subsequent cooling were performed under the conditions given in Table 2. Heating was performed using a high-frequency dielectric heating apparatus having a structure to heat only the vicinity of an electric resistance weld zone. Cooling was performed using a cooling apparatus which was placed above an electric resistance weld zone to be cooled and which has cooling heads having nozzles capable of jetting rodlike cooling water at a water flow rate of 0.9 $m^3/m^2$ min so that rodlike jets of cooling water can be jetted from the nozzles at a speed of 0.9 m/sec. In addition, the cooling heads had structures with which on-off control of cooling water injection from the individual nozzles could be separately performed. The electric resistance weld zones were cooled down to a temperature of 300° C. by determining the temperature of the electric resistance on the downstream side in the transportation direction of the steel pipe and by performing on-off control of water injection from individual headers on the basis of the determined steel pipe temperature so that the electric resistance weld zones were cooled at a cooling rate given in Table 2. Subsequently, product steel pipes were completed by performing a tempering treatment in which the electric resistance weld zones of the electric resistance welded steel pipes were subjected to an online heat treatment and heated up to a temperature of 450° C. so that a cumulative holding time at a temperature of 360° C. to 500° C. was controlled under the conditions given in Table 2.

Using test pieces cut out of the obtained product steel pipes, microstructure observation, analysis of inclusions in an electric resistance weld zone, a tensile test, a high-temperature tensile test and a creep test were performed. The testing methods will be described hereafter.

(1) Microstructure Observation

Using a test piece for microstructure observation cut out of the base metal portion of the obtained electric resistance welded steel pipe, by polishing and etching a cross section in the circumferential direction (C cross section) of the sample, by observing a microstructure using an electron scanning microscope (at a magnification of 1000 times), and by taking a photograph, microstructures were identified, and, further, by performing image analysis, the volume percentages of the microstructures and average grain diameters were determined. An average grain diameter was determined by determining the areas of individual grains, by calculating equivalent circle diameters for the areas and by calculating the arithmetic average of the equivalent circle diameters. Here, in a bainite phase, the size of an area in the same orientation (packet size) was determined as a grain diameter.

(2) Analysis of Inclusions in an Electric Resistance Weld Zone

A plate specimen having a width of 2 mm (having a width of 2 mm: a thickness equal to the whole thickness and a length equal to the whole thickness) and having the center of the electric resistance weld zone positioned at the center of the specimen was cut out of the electric resistance weld zone of the obtained electric resistance welded steel pipe. By performing electrolytic extraction on this plate type specimen in an electrolytic solution (10% AA solution), by collecting obtained extraction residue using a filter mesh (having a hole diameter of 5 μm), by determining the respective contents (mass ppm) of Si, Mn, Al and Ca in the extraction residue using inductively coupled plasma atomic emission spectroscopy, and by calculating the total value of the contents, the total value was defined as the total content (mass ppm) of Si, Mn, Al and Ca contained in inclusions having an equivalent circle diameter of 5 μm or more.

(3) Tensile Test

ASTM E8 round bar type specimens (having a parallel portion of 6.35 mmφ and a GL of 25.4 mm) were respectively cut out of the base metal portions and the electric resistance weld zone of the obtained electric resistance welded steel pipe so that the tensile direction was the circumferential direction of the pipe. The base metal portion was defined as a portion at a position located 180° from the electric resistance weld zone. The round bar type specimen was cut out of the electric resistance weld zone so that the seam of the electric resistance weld zone was located at the center of the parallel portion of the specimen. Flattening of a steel pipe was not performed when the specimen was cut out of the pipe.

A tensile test was performed at room temperature in a manner such that the speed of testing rate of stressing was 0.5%/min when the stress was equal to or less than the YS and 5 mm/min when the stress was more than the YS to determine tensile properties (yield strength YS and tensile strength TS).

(4) High-Temperature Tensile Test

A test material was cut out of the obtained electric resistance welded pipe and subjected to a heat treatment at a temperature of 400° C. and for a duration of 2340 hours. ASTM E8 round bar type specimens (having a parallel portion of 6.35 mmφ and a GL of 25.4 mm) were respectively cut out of the base metal portions and the electric resistance weld zones of the test material which had been subjected to the heat treatment and the test material which had not been subjected to the heat treatment so that the tensile direction was the circumferential direction of the pipe. The base metal portion was defined as a portion at a position located 180° from the electric resistance weld zone. The round bar type specimen was cut out of the electric resistance weld zone so that the seam of the electric resistance weld zone was located at the center of the parallel portion of the specimen. Flattening of a steel pipe was not performed when the specimen was cut out of the pipe.

A tensile test was performed to determine yield strength YS in a manner such that the test temperature was set to be 350° C. and the specimen was held at the test temperature for 15 minutes before tensile test was performed and that the speed of testing rate of stressing was 0.5%/min when the stress was equal to or less than the YS and 5 mm/min when the stress was more than the YS.

Using the determined values of yield strength YS, the amount ΔYS of decrease in YS between before and after the heat treatment was calculated respectively for the base metal portion and the electric resistance weld zone to evaluate resistance to softening for a long period. When ΔYS was less than 60 MPa was evaluated as "excellent in terms of resistance to softening for a long period".

(5) Creep Test

Specimens with slits prolongs (having a parallel portion of 6 mmφ and a GL of 30 mm) were cut out of the base metal portion and the electric resistance weld zone of the obtained electric resistance welded steel pipe so that the longitudinal direction of the specimen was the circumferential direction of the pipe. The base metal portion was defined as a portion at a position located 180° from the electric resistance weld zone. In addition, the specimen with slits prolongs was cut out of the electric resistance weld zone so that the seam of the electric resistance weld zone was located at the center of the parallel portion of the specimen.

A creep test was performed at a test temperature of 390° C. in order to determine creep rupture strength. By calculating an estimated creep rupture strength $\sigma_{creep}$ corresponding to that for a heat treatment at a temperature of 360° C. and for a duration of 20 years as converted using a Larson-Miller parameter from the obtained creep rupture strength, and by calculating $\sigma_{creep}/YS_{RT}$ which is the ratio of the estimated creep rupture strength to room temperature yield stress $YS_{RT}$, a case where $\sigma_{creep}/YS_{RT}$ was 0.8 or more was evaluated as "excellent in terms of creep rupture property".

The obtained results are given in Tables 3-1 and 3-2.

TABLE 1

| Steel No. | Chemical Composition (mass %) | | | | | | | | | | | | | | |
|---|---|---|---|---|---|---|---|---|---|---|---|---|---|---|---|
| | C | Si | Mn | P | S | Al | Nb | V | Ti | N | O | Ca | Cu, Ni, Mo, Cr | Pcm | Note |
| A | 0.042 | 0.11 | 0.92 | 0.005 | 0.0004 | 0.036 | 0.047 | 0.045 | 0.010 | 0.0035 | 0.0009 | 0.0020 | — | 0.10 | Example |
| B | 0.041 | 0.19 | 1.12 | 0.004 | 0.0006 | 0.030 | 0.051 | 0.052 | 0.012 | 0.0027 | 0.0012 | 0.0019 | Cu: 0.17, Ni: 0.14, Mo: 0.15 | 0.13 | Example |
| C | 0.052 | 0.20 | 1.35 | 0.012 | 0.0005 | 0.032 | 0.057 | 0.062 | 0.015 | 0.0036 | 0.0011 | 0.0025 | Cu: 014, Ni: 0.21 | 0.14 | Example |
| D | 0.047 | 0.18 | 1.70 | 0.012 | 0.0018 | 0.035 | 0.063 | 0.023 | 0.014 | 0.0033 | 0.0014 | 0.0018 | Cu: 0.23, Ni: 0.18, Mo: 0.17 | 0.17 | Example |
| E | 0.066 | 0.23 | 1.82 | 0.010 | 0.0016 | 0.037 | 0.060 | 0.024 | 0.016 | 0.0037 | 0.0011 | 0.0021 | Cr: 0.002 | 0.17 | Example |
| F | 0.024 | 0.27 | 1.44 | 0.014 | 0.0012 | 0.063 | 0.023 | 0.032 | 0.021 | 0.0014 | 0.0018 | 0.0002 | — | 0.11 | Comparative Example |
| G | 0.095 | 0.16 | 1.74 | 0.011 | 0.0008 | 0.026 | 0.014 | 0.012 | 0.016 | 0.0031 | 0.0012 | 0.0004 | — | 0.19 | Comparative Example |
| H | 0.055 | 0.05 | 1.52 | 0.016 | 0.0021 | 0.074 | 0.054 | 0.042 | 0.008 | 0.0030 | 0.0012 | 0.0007 | — | 0.14 | Comparative Example |
| I | 0.042 | 0.36 | 1.58 | 0.005 | 0.0015 | 0.038 | 0.052 | 0.054 | 0.016 | 0.0036 | 0.0044 | 0.0016 | — | 0.14 | Comparative Example |
| J | 0.037 | 0.19 | 0.64 | 0.017 | 0.0020 | 0.049 | 0.061 | 0.055 | 0.012 | 0.0018 | 0.0007 | 0.0021 | — | 0.08 | Comparative Example |

TABLE 1-continued

| Steel No. | Chemical Composition (mass %) | | | | | | | | | | | | | Pcm | Note |
|---|---|---|---|---|---|---|---|---|---|---|---|---|---|---|---|
| | C | Si | Mn | P | S | Al | Nb | V | Ti | N | O | Ca | Cu, Ni, Mo, Cr | | |
| K | 0.036 | 0.23 | <u>1.95</u> | 0.012 | 0.0008 | 0.021 | 0.025 | 0.014 | 0.017 | 0.0033 | 0.0015 | 0.0019 | — | 0.14 | Comparative Example |
| L | 0.042 | 0.27 | 1.23 | <u>0.021</u> | 0.0022 | 0.038 | 0.045 | 0.064 | 0.016 | 0.0008 | 0.0015 | 0.0026 | — | 0.12 | Comparative Example |
| M | 0.055 | 0.21 | 1.05 | 0.014 | <u>0.0032</u> | 0.035 | 0.003 | 0.015 | 0.014 | 0.0026 | 0.0016 | 0.0024 | — | 0.12 | Comparative Example |
| N | 0.071 | 0.19 | 1.28 | 0.018 | 0.0021 | <u>0.003</u> | 0.024 | 0.025 | 0.010 | 0.0032 | 0.0011 | 0.0011 | — | 0.14 | Comparative Example |
| O | 0.028 | 0.20 | 1.44 | 0.012 | 0.0025 | <u>0.123</u> | 0.024 | 0.043 | 0.008 | 0.0039 | 0.0022 | 0.0009 | — | 0.11 | Comparative Example |
| P | 0.036 | 0.20 | 1.36 | 0.006 | 0.0021 | 0.046 | <u>—</u> | 0.042 | 0.002 | 0.0042 | 0.0021 | 0.0016 | — | 0.11 | Comparative Example |
| Q | 0.061 | 0.24 | 1.48 | 0.011 | 0.0008 | 0.051 | <u>0.085</u> | 0.042 | 0.016 | 0.0036 | 0.0025 | 0.0032 | — | 0.15 | Comparative Example |
| R | 0.051 | 0.19 | 1.25 | 0.010 | 0.0004 | 0.026 | 0.014 | <u>—</u> | 0.022 | 0.0039 | 0.0008 | 0.0022 | — | 0.12 | Comparative Example |
| S | 0.071 | 0.21 | 0.87 | 0.012 | 0.0006 | 0.031 | 0.014 | <u>0.072</u> | 0.025 | 0.0025 | 0.0016 | 0.0034 | — | 0.13 | Comparative Example |
| T | 0.061 | 0.23 | 0.97 | 0.008 | 0.0007 | 0.041 | 0.054 | 0.012 | <u>—</u> | 0.0014 | 0.0016 | 0.0015 | — | 0.12 | Comparative Example |
| U | 0.064 | 0.20 | 0.95 | 0.009 | 0.0005 | 0.045 | 0.064 | 0.002 | <u>0.039</u> | 0.0026 | 0.0018 | 0.0008 | — | 0.12 | Comparative Example |
| V | 0.043 | 0.22 | 1.35 | 0.018 | 0.0009 | 0.024 | 0.047 | 0.005 | 0.023 | 0.0019 | 0.0006 | <u>—</u> | — | 0.12 | Comparative Example |
| W | 0.029 | 0.20 | 1.53 | 0.009 | 0.0021 | 0.042 | 0.042 | 0.018 | 0.031 | 0.0039 | 0.0024 | <u>0.0039</u> | — | 0.11 | Comparative Example |
| X | 0.034 | 0.18 | 1.35 | 0.004 | 0.0018 | 0.064 | 0.056 | 0.045 | 0.024 | <u>0.0056</u> | 0.0016 | 0.0021 | — | 0.11 | Comparative Example |
| Y | 0.036 | 0.19 | 1.20 | 0.008 | 0.0010 | 0.042 | 0.052 | 0.022 | 0.011 | 0.0025 | <u>0.0034</u> | 0.0046 | — | 0.10 | Comparative Example |
| Z | 0.072 | 0.23 | 1.75 | 0.008 | 0.0005 | 0.044 | 0.062 | 0.059 | 0.016 | 0.0047 | 0.0024 | 0.0015 | Cu: 0.25, Ni: 0.25, Mo: 0.25, Cr: 0.15 | <u>0.21</u> | Comparative Example |

TABLE 2

| | | Manufacturing Condition of Hot Rolled Steel Sheet | | | | | | |
|---|---|---|---|---|---|---|---|---|
| | | Heating | | Finish Rolling | | Cooling after Rolling | | | Holding Time in |
| | | | | Rolling | Completing | Average | Cooling Stop | Coiling | Temperature Range |
| Steel Pipe No. | Steel No. | Temperature (° C.) | Holding Time (min) | Reduction *(%) | Temperature **(° C.) | Cooling Rate ***(° C./sec.) | Temperature **(° C.) | Temperature **(° C.) | of 480° C. to 350° C. (hour) |
| 1-27 | A-Z | 1230 | 110 | 55 | 810 | 28 | 520 | 500 | 4 |

| | | Electric Resistance Welding Condition | | | Heat Treatment Condition of Electric Resistance Weld | | | | Steel Pipe Size | | |
|---|---|---|---|---|---|---|---|---|---|---|---|
| | | Atmosphere for Electric Resistance Welding | | | | | | Holding Time in Temperature | | | |
| Steel Pipe No. | Steel No. | End Face Groove | Oxygen Concentration | Number of Nozzle Layer | Heating Temperature (° C.) | Cooling Rate **(° C.) | Cooling Stop Temperature (° C.) | Range of 500° C. to 360° C. (sec) | Thickness (mm) | Outer Diameter (mmφ) | Note |
| 1-27 | A-Z | — | Atmospheric Air (23 mass %) | — | 1000 | 28 | 300 | 20 | 19.1 | 609.8 | Example |

*Hot rolling reduction in non-recrystallization temperature range
**Surface temperature of steel sheet
***Average cooling rate (° C./s) in temperature range of 780° C. to 620° C. in terms of temperature of central portion in thickness direction

TABLE 3-1

| | | Base Metal Property | | | | | | |
|---|---|---|---|---|---|---|---|---|
| | | Microstructure | | | | Resistance to Softening for Long Period | Creep Property | |
| Steel Pipe No. | Steel No. | Kind* | Average Grain Diameter of Main Phase (μm) | Fraction (area %) | Tensile Property | | | Note |
| | | | | | YS (MPa) | TS (MPa) | ΔYS (MPa) | $\sigma_{creep}/YS_{RT}$ | |
| 1 | A | QPF + B | 6.8 | QPF: 96 | 482 | 536 | 35 | 0.80 | Example |
| 2 | B | QPF + B | 5.9 | QPF: 94 | 497 | 555 | 36 | 0.81 | Example |
| 3 | C | QPF + B | 5.7 | QPF: 94 | 510 | 562 | 37 | 0.82 | Example |
| 4 | D | QPF + B | 3.6 | QPF: 93 | 613 | 672 | 36 | 0.88 | Example |
| 5 | E | QPF + B | 3.1 | QPF: 93 | 622 | 678 | 35 | 0.89 | Example |
| 6 | <u>F</u> | PF + B | <u>11.5</u> | <u>PF: 95</u> | <u>390</u> | 405 | 59 | <u>0.74</u> | Comparative Example |
| 7 | <u>G</u> | QPF + B | 4.5 | QPF: 76 | 659 | 717 | <u>68</u> | <u>0.78</u> | Comparative Example |
| 8 | <u>H</u> | QPF + B | 5.2 | QPF: 86 | 479 | 510 | 58 | <u>0.79</u> | Comparative Example |
| 9 | <u>I</u> | QPF + B | 4.6 | QPF: 91 | 512 | 560 | 57 | <u>0.78</u> | Comparative Example |
| 10 | <u>J</u> | PF + B | <u>12.7</u> | <u>PF: 94</u> | <u>365</u> | 388 | 58 | <u>0.73</u> | Comparative Example |
| 11 | <u>K</u> | B + M | 3.8 | <u>B: 78</u> | 669 | 716 | <u>69</u> | <u>0.76</u> | Comparative Example |
| 12 | <u>L</u> | QPF + B | 4.4 | QPF: 90 | 489 | 531 | 58 | <u>0.79</u> | Comparative Example |

TABLE 3-1-continued

| | | Base Metal Property | | | | | | |
|---|---|---|---|---|---|---|---|---|
| | | Microstructure | | | | Resistance to | | |
| Steel Pipe No. | Steel No. | Kind* | Average Grain Diameter of Main Phase (μm) | Fraction (area %) | Tensile Property YS (MPa) | TS (MPa) | Softening for Long Period ΔYS (MPa) | Creep Property $\sigma_{creep}/YS_{RT}$ | Note |
| 13 | M | QPF + B | 4.1 | QPF: 93 | 467 | 509 | 57 | 0.74 | Comparative Example |
| 14 | N | QPF + B | 5.4 | QPF: 91 | 501 | 544 | 58 | 0.77 | Comparative Example |
| 15 | O | QPF + B | 4.1 | QPF: 92 | 436 | 476 | 56 | 0.78 | Comparative Example |
| 16 | P | PF + B | 10.5 | PF: 96 | 370 | 408 | 58 | 0.74 | Comparative Example |
| 17 | Q | QPF + B | 3.7 | QPF: 86 | 518 | 564 | 63 | 0.77 | Comparative Example |
| 18 | R | PF + B | 10.2 | PF: 95 | 380 | 418 | 59 | 0.72 | Comparative Example |
| 19 | S | QPF + B | 5.2 | QPF: 88 | 520 | 562 | 64 | 0.75 | Comparative Example |
| 20 | T | PF + B | 12.0 | PF: 93 | 390 | 450 | 58 | 0.72 | Comparative Example |
| 21 | U | QPF + B | 4.7 | QPF: 93 | 516 | 560 | 68 | 0.77 | Comparative Example |
| 22 | V | QPF + B | 5.3 | QPF: 96 | 490 | 533 | 61 | 0.77 | Comparative Example |
| 23 | W | QPF + B | 4.3 | QPF: 95 | 469 | 519 | 57 | 0.78 | Comparative Example |
| 24 | X | QPF + B | 4.6 | QPF: 92 | 490 | 546 | 63 | 0.74 | Comparative Example |
| 25 | Y | QPF + B | 4.4 | QPF: 93 | 497 | 546 | 58 | 0.81 | Comparative Example |
| 26 | Z | B + M | 3.5 | B: 75 | 658 | 728 | 61 | 0.75 | Comparative Example |

*QPF: quasi-polgonal ferrite phase, PF: polygonal ferrite phase, B: bainite phase, M: martensite phase, P: Pearlite phase, DP: quasi-pearlite phase, C:, cementite phase

TABLE 3-2

| | | Electric Resistance Weld Property | | | | | | | |
|---|---|---|---|---|---|---|---|---|---|
| | | Microstructure | | | | Cleanness Total Alloy Content in Inclusion Having Equivalent Circle Diameter of 5 μm or More **(mass ppm) | Resistance to Softening for Long Period ΔYS (MPa) | Creep Property $\sigma_{creep}/YS_{RT}$ | |
| Steel Pipe No. | Steel No. | Kind* | Average Grain Diameter of Main Phase (μm) | Fraction (area %) | Tensile Property YS (MPa) | TS (MPa) | | | Note |
| 1 | A | QPF + B | 8.5 | QPF: 95 | 492 | 562 | 22 | 41 | 0.80 | Example |
| 2 | B | QPF + B | 6.8 | QPF: 93 | 503 | 573 | 18 | 40 | 0.80 | Example |
| 3 | C | QPF + B | 6.5 | QPF: 94 | 514 | 590 | 24 | 43 | 0.81 | Example |
| 4 | D | QPF + B | 4.2 | QPF: 93 | 609 | 689 | 25 | 48 | 0.87 | Example |
| 5 | E | QPF + B | 4.4 | QPF: 93 | 610 | 692 | 27 | 46 | 0.88 | Example |
| 6 | F | PF + B | 12.3 | PF: 96 | 367 | 417 | 46 | 66 | 0.68 | Comparative Example |
| 7 | G | QPF + B | 4.9 | QPF: 76 | 623 | 708 | 29 | 72 | 0.75 | Comparative Example |
| 8 | H | QPF + B | 5.4 | QPF: 87 | 444 | 505 | 67 | 66 | 0.72 | Comparative Example |
| 9 | I | QPF + B | 4.9 | QPF: 93 | 480 | 545 | 90 | 63 | 0.70 | Comparative Example |
| 10 | J | PF + B | 13.2 | PF: 95 | 342 | 390 | 58 | 63 | 0.69 | Comparative Example |
| 11 | K | B + M | 4.2 | B: 77 | 629 | 715 | 57 | 73 | 0.74 | Comparative Example |
| 12 | L | QPF + B | 4.7 | QPF: 90 | 456 | 518 | 52 | 62 | 0.76 | Comparative Example |
| 13 | M | QPF + B | 4.5 | QPF: 93 | 444 | 505 | 50 | 63 | 0.72 | Comparative Example |
| 14 | N | QPF + B | 5.2 | QPF: 92 | 480 | 545 | 67 | 64 | 0.71 | Comparative Example |
| 15 | O | QPF + B | 4.2 | QPF: 93 | 410 | 466 | 76 | 63 | 0.70 | Comparative Example |
| 16 | P | PF + B | 11.0 | PF: 96 | 450 | 524 | 48 | 62 | 0.68 | Comparative Example |
| 17 | Q | QPF + B | 4.3 | QPF: 86 | 480 | 545 | 48 | 69 | 0.75 | Comparative Example |
| 18 | R | PF + B | 10.4 | PF: 95 | 360 | 432 | 45 | 63 | 0.67 | Comparative Example |
| 19 | S | QPF + B | 5.8 | QPF: 86 | 490 | 557 | 46 | 69 | 0.74 | Comparative Example |
| 20 | T | PF + B | 12.7 | PF: 92 | 371 | 431 | 46 | 64 | 0.68 | Comparative Example |
| 21 | U | QPF + B | 5.4 | QPF: 93 | 487 | 553 | 55 | 70 | 0.73 | Comparative Example |
| 22 | V | QPF + B | 5.8 | QPF: 96 | 462 | 525 | 53 | 67 | 0.74 | Comparative Example |
| 23 | W | QPF + B | 4.4 | QPF: 97 | 450 | 511 | 75 | 62 | 0.71 | Comparative Example |
| 24 | X | QPF + B | 5.0 | QPF: 92 | 462 | 525 | 57 | 69 | 0.73 | Comparative Example |
| 25 | Y | QPF + B | 4.3 | QPF: 93 | 469 | 533 | 74 | 62 | 0.71 | Comparative Example |
| 26 | Z | QPF + B | 4.1 | QPF: 75 | 618 | 702 | 45 | 61 | 0.73 | Comparative Example |

**total content of Si, Mn, Al, Ca and Cr contained in inclusions having an equivalent circle diameter of 5 μm or more Any of the examples was an electric resistance welded steel pipe having a fine microstructure including, in terms of volume percentage, 90% or more of a quasi-polygonal ferrite phase as a main phase in both the base metal portion and the electrical resistance weld zone, in which an average grain diameter was 10 μm or less, a high strength of 450 MPa in terms of yield strength, excellent resistance to softening in a long period as indicated by a ΔYS of less than 60 MPa and an excellent creep rupture strength as indicated by a $\sigma_{creep}/YS_{RT}$, which is the ratio of creep rupture strength $\sigma_{creep}$ to room temperature yield strength $YS_{RT}$, of 0.80 or more.

On the other hand, in the comparative examples having chemical compositions out of our range, since the desired microstructure was not achieved in at least one of a base metal portion and an electric resistance weld zone, we found that a desired high strength of 450 MPa or more in terms of yield strength was not achieved, that there was a deterioration in resistance to softening in a long period as indicated by a ΔYS of less than 60 MPa or that there was a deterioration in creep rupture property.

On the other hand, in the comparative examples (steel pipe No. 6, No. 10, No. 16, No. 18 and No. 20) where the content of C, Mn, Nb, V or Ti was less than our range, since a microstructure mainly including a softer polygonal ferrite phase was formed in both the base metal portion and the electric resistance weld zone, YS was less than 450 MPa, which means that the desired strength was not achieved. In addition, in the comparative examples (steel pipe No. 7, No. 11, No. 17, No. 19 and No. 21) where the content of C, Mn, Nb, V or Ti was more than our range, both the base metal portion and the electric resistance weld zone had deteriorated resistance to softening in a long period as indicated by a ΔYS of 60 MPa or more and deteriorated creep rupture property as indicated by a $\sigma_{creep}/YS_{RT}$ of less than 0.80.

In addition, in the comparative examples (steel pipe No. 8, No. 9, No. 14, No. 15, No. 23 and No. 25) where the content of Si, Al, Ca or O was out of our range, since the total content of Si, Mn, Al, Ca and Cr contained in inclusions having an equivalent circle diameter of 5 μm or more in an electric resistance weld zone was more than 49 mass ppm, the electric resistance weld zone had a ΔYS of 60 MPa or more, deteriorated resistance to softening in a long period and a reduced creep rupture property as indicated by a $\sigma_{creep}/YS_{RT}$ of less than 0.80.

In addition, in the comparative examples (steel pipe No. 12, No. 13, No. 22, No. 24 and No. 26) where the content of P, S, Ca or N or the value of Pcm was out of our range, since the electric resistance weld zone had a ΔYS of 60 MPa or more, there was a deterioration in resistance to softening for a long period and there was a deterioration in creep rupture property as indicated by a $\sigma_{creep}/YS_{RT}$ of less than 0.80.

Example 2

By heating and soaking steel materials (slabs having a thickness of 250 mm) having chemical compositions of steel A through steel E given in Table 1 under the heating conditions given in Table 4-1, by subsequently performing rough rolling and finish rolling under the conditions given in Table 4-1, by subsequently performing cooling after rolling, under the conditions given in Table 4-1 and by coiling the cooled hot rolled steel sheet at a coiling temperature given in Table 4-1, hot rolled steel sheets were manufactured. The coiled hot rolled steel sheets were subjected to a thermal history in which a holding time at a temperature of 350° C. to 480° C. was controlled under the conditions given in Table 4-1 by adjusting a coiling temperature and the cooling conditions of the coiled steel sheet.

Using the obtained hot rolled steel sheets as raw materials for steel pipes, by slitting the materials into a specified width, by continuously forming the slit hot rolled steel sheets into open pipes having an approximately circular cross section by performing roll forming, and by performing electric resistance welding in which the vicinity of the butted portions of the open pipes were heat up to a temperature higher than the melting point and welded by pressure using a squeeze roll, electric resistance steel pipes having the sizes given in Table 4-2 were manufactured.

In some cases, a taper type groove was formed in both end faces in the width direction of the hot rolled steel sheet when finpass forming was performed when roll forming was performed. The taper type groove was formed in both end faces in the width direction of the hot rolled steel sheet so that the distance in the thickness direction of the steel sheet between the starting position of the taper and the surface of the steel sheet which was to become the outer surface of the steel pipe was 20% and so that the distance in the thickness direction of the steel sheet between the starting position of the taper and the surface of the steel sheet which was to become the inner surface of the steel pipe was 20%, which is represented by outside20%-inside20%.

In addition, electric resistance welding was performed in atmospheric air (having an oxygen concentration of 21 vol % and 23 mass %). In addition, in some cases, electric resistance welding was performed in an atmosphere in which oxygen concentration was decreased to 45 ppm by jetting an inert gas ($N_2$ gas) using nozzles having a three-layered jet orifice.

Subsequently, the electric resistance weld zones of the obtained electric resistance welded steel pipes were subjected to online heat treatment and heated under the conditions given in Table 4-2 using the same high-frequency dielectric heating apparatus as used in Example 1, and the cooled under the conditions given in Table 4-2 using the same cooling apparatus as used in Example 1. Subsequently, product steel pipes were completed by performing a heat treatment in which a cooling rate at a temperature of 500° C. to 360° C. and a cumulative holding time at a temperature of 500° C. to 360° C. from a tempering treatment in which the steel pipe is heated up to a temperature of 500° C. to 360° C. were controlled under the conditions given in Table 4-2.

Using test pieces cut out of the obtained electric resistance welded steel pipes using the methods as used in Example 1, microstructure observation, analysis of inclusions in an electric resistance weld zone, a tensile test, a high-temperature tensile test and a creep test were performed. The testing methods were the same as used in Example 1.

The obtained results are given in Tables 5-1 and 5-2.

TABLE 4-1

Manufacturing Condition of Hot Rolled Steel Sheet

| Steel Pipe No. | Steel No. | Heating | | Rolling Reduction *(%) | Finish Rolling Completing Temperature (° C.) | Cooling after Rolling | | | Holding Time in Temperature Range of 480° C. to 350° C. (hour) | Note |
|---|---|---|---|---|---|---|---|---|---|---|
| | | Temperature (° C.) | Holding Time (min) | | | Average Cooling Rate **(° C/sec.) | Cooling Stop Temperature (° C.) | Coiling Temperature **(° C.) | | |
| 27 | A | 1240 | 120 | 45 | 810 | 25 | 550 | 550 | 4 | Example |
| 28 | A | 1290 | 120 | 45 | 810 | 25 | 550 | 550 | 4 | Comparative Example |

TABLE 4-1-continued

Manufacturing Condition of Hot Rolled Steel Sheet

| Steel Pipe No. | Steel No. | Heating Temperature (° C.) | Holding Time (min) | Rolling Reduction *(%) | Finish Rolling Completing Temperature (° C.) | Cooling after Rolling Average Cooling Rate **(° C/sec.) | Cooling Stop Temperature (° C.) | Coiling Temperature **(° C.) | Holding Time in Temperature Range of 480° C. to 350° C. (hour) | Note |
|---|---|---|---|---|---|---|---|---|---|---|
| 29 | A | <u>1180</u> | 120 | 45 | 810 | 25 | 550 | 550 | 4 | Comparative Example |
| 30 | A | 1240 | <u>70</u> | 45 | 810 | 25 | 550 | 550 | 4 | Comparative Example |
| 31 | A | 1240 | 120 | <u>15</u> | 810 | 25 | 550 | 550 | 4 | Comparative Example |
| 32 | B | 1250 | 100 | 60 | 810 | 57 | 550 | 540 | 3 | Comparative Example |
| 33 | B | 1250 | 100 | 60 | 810 | 57 | 550 | 540 | 3 | Example |
| 34 | B | 1250 | 100 | 60 | 810 | 57 | 550 | 540 | 3 | Example |
| 35 | B | 1250 | 100 | 60 | 810 | 57 | 550 | 540 | 3 | Example |
| 36 | B | 1250 | 100 | 60 | 810 | 57 | 550 | 540 | 3 | Comparative Example |
| 37 | C | 1220 | 110 | 25 | 810 | 26 | 550 | 550 | 3 | Comparative Example |
| 38 | C | 1220 | 110 | 25 | 810 | 26 | 550 | 550 | 3 | Example |
| 39 | C | 1220 | 110 | 25 | 810 | 26 | 550 | 550 | 3 | Example |
| 40 | C | 1220 | 110 | 25 | 810 | 26 | 550 | 550 | 3 | Example |
| 41 | C | 1220 | 110 | 25 | 810 | 26 | 550 | 550 | 3 | Comparative Example |
| 42 | D | 1270 | 105 | 50 | 810 | <u>6</u> | 590 | 590 | 10 | Comparative Example |
| 43 | D | 1270 | 105 | 50 | 810 | 13 | 590 | 590 | 10 | Example |
| 44 | D | 1270 | 105 | 50 | 810 | 26 | 590 | 590 | 10 | Example |
| 45 | D | 1270 | 105 | 50 | 810 | 145 | 590 | 590 | 10 | Example |
| 46 | D | 1270 | 105 | 50 | 810 | <u>350</u> | 590 | 590 | 10 | Comparative Example |
| 47 | D | 1240 | 95 | 40 | 810 | 18 | 550 | 480 | <u>1</u> | Comparative Example |
| 48 | D | 1240 | 95 | 40 | 810 | 18 | 550 | 480 | 5 | Example |
| 49 | D | 1240 | 95 | 40 | 810 | 18 | 550 | 480 | <u>50</u> | Comparative Example |
| 50 | D | 1240 | 95 | 40 | 810 | 18 | 550 | 480 | 5 | Comparative Example |
| 51 | D | 1240 | 95 | 40 | 810 | 18 | 550 | 480 | 5 | Comparative Example |
| 52 | E | 1250 | 110 | 60 | 810 | 29 | 550 | 540 | 5 | Comparative Example |
| 53 | E | 1250 | 110 | 60 | 810 | 29 | 550 | 540 | 5 | Example |
| 54 | E | 1250 | 110 | 60 | 810 | 29 | 550 | 540 | 5 | Example |
| 55 | E | 1250 | 110 | 60 | 810 | 29 | 550 | 540 | 5 | Example |
| 56 | E | 1250 | 110 | 60 | 810 | 29 | 550 | 540 | 5 | Comparative Example |

*Hot rolling reduction in non-recrystallization temperature range
**Average cooling area (° C./sec) in temperature of 780° C. to 620° C. in terms of temperature of central portion in thickness direction

TABLE 4-2

| Steel Pipe No. | Steel No. | Electric Resistance Welding Condition | | | | Heat Treatment Condition of Electric Resistance Weld | |
|---|---|---|---|---|---|---|---|
| | | End Face Groove*** | Atmosphere for Electric Resistance Welding | | | Heating Temperature (° C.) | Average Cooling Rate **(° C.) |
| | | | Oxygen Concentration | | Number of Nozzle Layer | | |
| 27 | A | — | Atmospheric Air (23 mass %) | | — | 910~1060 | 25 |
| 28 | A | — | Atmospheric Air (23 mass %) | | — | 910~1060 | 25 |
| 29 | A | — | Atmospheric Air (23 mass %) | | — | 910~1060 | 25 |
| 30 | A | — | Atmospheric Air (23 mass %) | | — | 910~1060 | 25 |
| 31 | A | — | Atmospheric Air (23 mass %) | | — | 910~1060 | 25 |
| 32 | B | — | Atmospheric Air (23 mass %) | | — | 920~1050 | <u>6</u> |
| 33 | B | — | Atmospheric Air (23 mass %) | | — | 920~1050 | 14 |
| 34 | B | — | Atmospheric Air (23 mass %) | | — | 920~1050 | 25 |
| 35 | B | — | Atmospheric Air (23 mass %) | | — | 920~1050 | 55 |
| 36 | B | — | Atmospheric Air (23 mass %) | | — | 920~1050 | <u>350</u> |

TABLE 4-2-continued

| | | | | | | |
|---|---|---|---|---|---|---|
| 37 | C | — | Atmospheric Air (23 mass %) | — | <u>760</u>~1050 | 28 |
| 38 | C | — | Atmospheric Air (23 mass %) | — | 900~1120 | 28 |
| 39 | C | — | 45 mass ppm | 3 | 900~1120 | 28 |
| 40 | C | Inside20 + Outside20 | Atmospheric Air (23 mass %) | — | 900~1120 | 28 |
| 41 | C | — | Atmospheric Air (23 mass %) | — | 950~<u>1160</u> | 28 |
| 42 | D | — | Atmospheric Air (23 mass %) | — | 890~1030 | 49 |
| 43 | D | — | Atmospheric Air (23 mass %) | — | 890~1030 | 49 |
| 44 | D | — | Atmospheric Air (23 mass %) | — | 890~1030 | 49 |
| 45 | D | — | Atmospheric Air (23 mass %) | — | 890~1030 | 49 |
| 46 | D | — | Atmospheric Air (23 mass %) | — | 890~1030 | 49 |
| 47 | D | — | Atmospheric Air (23 mass %) | — | 910~1080 | 33 |
| 48 | D | — | Atmospheric Air (23 mass %) | — | 910~1080 | 33 |
| 49 | D | — | Atmospheric Air (23 mass %) | — | 910~1080 | 33 |
| 50 | D | — | Atmospheric Air (23 mass %) | — | 910~1080 | 33 |
| 51 | D | — | Atmospheric Air (23 mass %) | — | 910~1080 | 33 |
| 52 | E | — | Atmospheric Air (23 mass %) | — | 900~1090 | <u>6</u> |
| 53 | E | — | Atmospheric Air (23 mass %) | — | 900~1090 | 27 |
| 54 | E | — | Atmospheric Air (23 mass %) | — | 900~1090 | 35 |
| 55 | E | — | Atmospheric Air (23 mass %) | — | 900~1090 | 64 |
| 56 | E | — | Atmospheric Air (23 mass %) | — | 900~1090 | <u>320</u> |

| Steel Pipe No. | Heat Treatment Condition of Electric Resistance Weld | | Steel Pipe Size | | Note |
|---|---|---|---|---|---|
| | Cooling Stop Temperature (° C.) | Holding Time in Temperature Range of 500° C. to 360° C. (sec.) | Thickness (mm) | Outer Diameter (mmφ) | |
| 27 | 450 | 30 | 19.1 | 660.4 | Example |
| 28 | 450 | 30 | 19.1 | 660.4 | Comparative Example |
| 29 | 450 | 30 | 19.1 | 660.4 | Comparative Example |
| 30 | 450 | 30 | 19.1 | 660.4 | Comparative Example |
| 31 | 450 | 30 | 19.1 | 660.4 | Comparative Example |
| 32 | 400 | 20 | 16.0 | 660.4 | Comparative Example |
| 33 | 400 | 20 | 16.0 | 660.4 | Example |
| 34 | 400 | 20 | 16.0 | 660.4 | Example |
| 35 | 400 | 20 | 16.0 | 660.4 | Example |
| 36 | 400 | 20 | 16.0 | 660.4 | Comparative Example |
| 37 | 200 | 10 | 32.0 | 508.0 | Comparative Example |
| 38 | 200 | 10 | 32.0 | 508.0 | Example |
| 39 | 200 | 10 | 32.0 | 508.0 | Example |
| 40 | 200 | 10 | 32.0 | 508.0 | Example |
| 41 | 200 | 10 | 32.0 | 508.0 | Comparative Example |
| 42 | 100 | 4 | 10.5 | 609.6 | Comparative Example |
| 43 | 100 | 4 | 10.5 | 609.6 | Example |
| 44 | 100 | 4 | 10.5 | 609.6 | Example |
| 45 | 100 | 4 | 10.5 | 609.6 | Example |
| 46 | 100 | 4 | 10.5 | 609.6 | Comparative Example |
| 47 | 450 | 30 | 25.4 | 457.2 | Comparative Example |
| 48 | 450 | 30 | 25.4 | 457.2 | Example |
| 49 | 450 | 30 | 25.4 | 457.2 | Comparative Example |
| 50 | 20 | <u>1</u> | 25.4 | 457.2 | Comparative Example |
| 51 | 200 | <u>360</u>**** | 25.4 | 457.2 | Comparative Example |
| 52 | 200 | 120**** | 20.5 | 660.4 | Comparative Example |
| 53 | 200 | 120**** | 20.5 | 660.4 | Example |
| 54 | 200 | 120**** | 20.5 | 660.4 | Example |
| 55 | 200 | 120**** | 20.5 | 660.4 | Example |
| 56 | 200 | 120**** | 20.5 | 660.4 | Comparative Example |

***Outsidexx: (distance between starting position of taper and surface of steel sheet which is to become outer surface of steel pipe)/(pipe thickness) x 100(%) Insidexx: (distance between starting position of taper and surface of steel sheet which is to become inner surface of steel pipe)/(pipe thickness) x 100(%)
****Tempering treatment at was 400° C. was performed

TABLE 5-1

Base Metal Property

| Steel Pipe No. | Steel No. | Microstructure Kind* | Average Grain Diameter of Main Phase (μm) | Fraction (area %) | Tensile Property YS (MPa) | Tensile Property TS (MPa) | Resistance to Softening for Long Period ΔYS (MPa) | Creep Property $\sigma_{creep}/YS_{RT}$ | Note |
|---|---|---|---|---|---|---|---|---|---|
| 27 | A | QPF + B | 6.5 | QPF: 95 | 490 | 533 | 35 | 0.80 | Example |
| 28 | A | QPF + B | 10.8 | QPF: 93 | 483 | 538 | 62 | 0.75 | Comparative Example |
| 29 | A | QPF + B | 7.8 | QPF: 93 | 387 | 437 | 61 | 0.75 | Comparative Example |
| 30 | A | QPF + B | 6.8 | QPF: 93 | 427 | 489 | 62 | 0.74 | Comparative Example |
| 31 | A | QPF + B | 12.4 | QPF: 92 | 436 | 492 | 64 | 0.73 | Comparative Example |
| 32 | B | QPF + B | 5.4 | QPF: 94 | 501 | 550 | 36 | 0.81 | Comparative Example |
| 33 | B | QPF + B | 5.4 | QPF: 94 | 501 | 550 | 36 | 0.81 | Example |
| 34 | B | QPF + B | 5.4 | QPF: 94 | 501 | 550 | 36 | 0.81 | Example |
| 35 | B | QPF + B | 5.4 | QPF: 94 | 501 | 550 | 36 | 0.81 | Example |
| 36 | B | QPF + B | 5.4 | QPF: 94 | 501 | 550 | 36 | 0.81 | Comparative Example |
| 37 | C | QPF + B | 5.4 | QPF: 93 | 489 | 533 | 35 | 0.81 | Comparative Example |
| 38 | C | QPF + B | 5.4 | QPF: 93 | 489 | 533 | 35 | 0.81 | Example |
| 39 | C | QPF + B | 5.4 | QPF: 93 | 489 | 533 | 35 | 0.81 | Example |
| 40 | C | QPF + B | 5.4 | QPF: 93 | 489 | 533 | 35 | 0.81 | Example |
| 41 | C | QPF + B | 5.4 | QPF: 93 | 489 | 533 | 35 | 0.81 | Comparative Example |
| 42 | D | PF + B | 10.6 | PF: 93 | 395 | 489 | 62 | 0.75 | Comparative Example |
| 43 | D | QPF + B | 5.2 | QPF: 93 | 589 | 640 | 36 | 0.81 | Example |
| 44 | D | QPF + B | 3.7 | QPF: 93 | 610 | 663 | 35 | 0.82 | Example |
| 45 | D | QPF + B | 3.5 | QPF: 91 | 623 | 677 | 37 | 0.81 | Example |
| 46 | D | B + M | 3.2 | B:78 | 656 | 725 | 63 | 0.77 | Comparative Example |
| 47 | D | B + M | 3.2 | B:78 | 745 | 810 | 64 | 0.79 | Comparative Example |
| 48 | D | QPF + B | 3.4 | QPF: 93 | 720 | 780 | 34 | 0.88 | Example |
| 49 | D | QPF + B | 3.5 | QPF: 94 | 705 | 755 | 62 | 0.79 | Comparative Example |
| 50 | D | QPF + B | 3.4 | QPF: 93 | 720 | 780 | 34 | 0.88 | Comparative Example |
| 51 | D | QPF + B | 3.4 | QPF: 93 | 720 | 780 | 34 | 0.88 | Comparative Example |
| 52 | E | QPF + B | 3.3 | QPF: 93 | 623 | 672 | 33 | 0.89 | Comparative Example |
| 53 | E | QPF + B | 3.3 | QPF: 93 | 623 | 672 | 33 | 0.89 | Example |
| 54 | E | QPF + B | 3.3 | QPF: 93 | 623 | 672 | 33 | 0.89 | Example |
| 55 | E | QPF + B | 3.3 | QPF: 93 | 623 | 672 | 33 | 0.89 | Example |
| 56 | E | QPF + B | 33 | QPF: 93 | 623 | 672 | 33 | 0.89 | Comparative Example |

*QPF: quasi-polygonal ferrite phase, PF: polygonal ferrite phase, B: bainite phase, M: martensite phase, P: Pearlite phase

TABLE 5-2

Electric Resistance Weld Property

| Steel Pipe No. | Steel No. | Microstructure Kind* | Average Grain Diameter of Main Phase (μm) | Fraction (area %) | Tensile Property YS (MPa) | Tensile Property TS (MPa) | Cleanness Total Alloy Content in Inclusion Having Equivalent Circle Diameter of 5 μm or More **(mass ppm) | Resistance to Softening for Long Period ΔYS (MPa) | Creep Property $\sigma_{creep}/YS_{RT}$ | Note |
|---|---|---|---|---|---|---|---|---|---|---|
| 27 | A | QPF + B | 8.3 | QPF: 95 | 486 | 552 | 26 | 39 | 0.80 | Example |
| 28 | A | QPF + B | 9.6 | QPF: 94 | 476 | 534 | 36 | 65 | 0.73 | Comparative Example |
| 29 | A | QPF + B | 9.2 | QPF: 94 | 389 | 438 | 38 | 61 | 0.71 | Comparative Example |
| 30 | A | QPF + B | 8.8 | QPF: 93 | 429 | 489 | 37 | 67 | 0.72 | Comparative Example |
| 31 | A | QPF + B | 9.8 | QPF: 93 | 435 | 479 | 36 | 69 | 0.70 | Comparative Example |
| 32 | B | PF + B | 12.4 | PF: 94 | 387 | 440 | 35 | 65 | 0.75 | Comparative Example |
| 33 | B | QPF + B | 7.8 | QPF: 94 | 488 | 555 | 28 | 30 | 0.80 | Example |
| 34 | B | QPF + B | 6.6 | QPF: 93 | 498 | 566 | 27 | 37 | 0.80 | Example |
| 35 | B | QPF + B | 6.3 | QPF: 93 | 512 | 582 | 26 | 38 | 0.80 | Example |
| 36 | B | B + M | 6.9 | B: 88 | 578 | 657 | 36 | 68 | 0.74 | Comparative Example |
| 37 | C | PF + B | 10.9 | PF: 94 | 393 | 442 | 35 | 64 | 0.78 | Comparative Example |
| 38 | C | QPF + B | 5.9 | QPF: 94 | 498 | 560 | 28 | 37 | 0.80 | Example |
| 39 | C | QPF + B | 6.4 | QPF: 93 | 505 | 576 | 17 | 25 | 0.82 | Example |
| 40 | C | QPF + B | 6.3 | QPF: 93 | 506 | 569 | 18 | 27 | 0.82 | Example |
| 41 | C | QPF + B | 12.3 | QPF: 67 | 561 | 630 | 35 | 62 | 0.77 | Comparative Example |
| 42 | D | QPF + B | 5.4 | QPF: 94 | 547 | 615 | 38 | 61 | 0.75 | Comparative Example |
| 43 | D | QPF + B | 4.9 | QPF: 93 | 565 | 635 | 28 | 39 | 0.80 | Example |
| 44 | D | QPF + B | 4.7 | QPF: 93 | 595 | 682 | 27 | 38 | 0.81 | Example |
| 45 | D | QPF + B | 45 | QPF: 93 | 594 | 667 | 28 | 39 | 0.80 | Example |
| 46 | D | QPF + B | 42 | QPF: 91 | 605 | 680 | 39 | 62 | 0.76 | Comparative Example |
| 47 | D | QPF + B | 6.4 | QPF: 95 | 695 | 781 | 35 | 63 | 0.78 | Comparative Example |
| 48 | D | QPF + B | 3.2 | QPF: 93 | 712 | 800 | 28 | 37 | 0.85 | Example |

TABLE 5-2-continued

Electric Resistance Weld Property

| Steel Pipe No. | Steel No. | Microstructure Kind* | Average Grain Diameter of Main Phase (μm) | Fraction (area %) | Tensile Property YS (MPa) | TS (MPa) | Cleanness Total Alloy Content in Inclusion Having Equivalent Circle Diameter of 5 μm or More **(mass ppm) | Resistance to Softening for Long Period ΔYS (MPa) | Creep Property $\sigma_{creep}/YS_{RT}$ | Note |
|---|---|---|---|---|---|---|---|---|---|---|
| 49 | D | QPF + B | 3.7 | QPF: 93 | 706 | 806 | 37 | <u>61</u> | 0.77 | Comparative Example |
| 50 | D | B + M | 2.8 | <u>B: 75</u> | 758 | 856 | 36 | <u>63</u> | 0.78 | Comparative Example |
| 51 | D | QPF + B | 6.8 | QPF: 93 | 695 | 781 | 35 | <u>65</u> | 0.76 | Comparative Example |
| 52 | E | PF + B | <u>10.3</u> | PF: 93 | <u>394</u> | 469 | 36 | <u>63</u> | 0.78 | Comparative Example |
| 53 | E | QPF + B | 4.6 | QPF: 93 | 594 | 669 | 29 | 39 | 0.87 | Example |
| 54 | E | QPF + B | 4.6 | QPF: 93 | 587 | 661 | 29 | 38 | 0.88 | Example |
| 55 | E | QPF + B | 4.3 | QPF: 91 | 605 | 680 | 29 | 39 | 0.87 | Example |
| 56 | E | QPF + B | 4.1 | QPF: <u>77</u> | 656 | 737 | 35 | <u>63</u> | 0.77 | Comparative Example |

**total content of Si, Mn, Al, Ca and Cr contained in inclusions having an equivalent circle diameter of 5 μm or more All our examples were electric resistance welded steel pipes having a fine microstructure including, in terms of volume percentage, 90% or more of a quasi-polygonal ferrite phase as a main phase in both the base metal portion and the electrical resistance weld zone, in which an average grain diameter was 10 μm or less, a high strength of 450 MPa in terms of yield strength, excellent resistance to softening in a long period as indicated by a ΔYS of less than 60 MPa and an excellent creep rupture strength as indicated by a $\sigma_{creep}/YS_{RT}$, which is the ratio of creep rupture strength $\sigma_{creep}$ to room temperature yield strength $YS_{RT}$, of 0.80 or more.

On the other hand, in the comparative examples having chemical composition out of our range, since the desired microstructure was not achieved in at least one of the base metal portion and the electric resistance weld zone, we found that a desired high strength of 450 MPa or more in terms of yield strength was not achieved, that there was a deterioration in resistance to softening in a long period as indicated by a ΔYS of less than 60 MPa or that there was a deterioration in creep rupture property.

In addition, in the comparative example (steel pipe No. 28) where a slab heating temperature was higher than our preferable range, since the desired microstructure was not achieved as indicated by an average grain diameter of more than 10 μm in the base metal portion, there was a deterioration in resistance to softening for a long period as indicated by a ΔYS of 60 MPa or more, and there was a deterioration in creep rupture property as indicated by a $\sigma_{creep}/YS_{RT}$ of less than 0.80. In addition, in the comparative example (steel pipe No. 29) where a slab heating temperature lower than our preferable range, the desired high strength was not achieved in the base metal portion and the electric resistance weld zone as indicated by a tensile strength TS of less than 450 MPa, and there was a deterioration in resistance to softening in a long period and creep rupture property. In addition, in the comparative example (steel pipe No. 30) where the holding time in a slab heating process was less than our preferable range, since Nb precipitates having a large grain diameter were retained, there was a deterioration in the resistance to softening for a long period and creep rupture property of the base metal portion and the electric resistance weld zone. In addition, in the comparative example (pipe No. 31) where hot rolling reduction in the non-recrystallization temperature range was less than our preferable range, since the desired microstructure was not achieved as indicated by an average grain diameter in the base metal portion of more than 10 μm, there was a deterioration in resistance to softening in a long period as indicated by a ΔYS of 60 MPa or more, and there was a deterioration in creep rupture property as indicated by a $\sigma_{creep}/YS_{RT}$ of less than 0.80.

In addition, in the comparative example (steel pipe No. 32) where a cooling rate after heating had been performed in a heat treatment of an electric resistance weld zone was less than our preferable range, since the desired microstructure was not achieved due to an increase in the grain diameter of a microstructure in an electric resistance weld zone, a desired high strength of 450 MPa or more in terms of yield strength was not achieved, and there was a deterioration in resistance to softening for a long period and creep rupture property. In the comparative example (steel pipe No. 36) where a cooling rate after heating had been performed in a heat treatment of an electric resistance weld zone was less than our preferable range, since the desired microstructure was not achieved due to the electric resistance weld zone having a microstructure mainly including a bainite phase, there was a deterioration in resistance to softening for a long period and creep rupture property.

In addition, in the comparative example (steel pipe No. 42) where a cooling rate after hot rolling had been performed was less than our preferable range, since the desired microstructure was not achieved due to an increase in the grain diameter of a microstructure in the base metal portion, there was a deterioration in resistance to softening for a long period and creep rupture property. In addition, in the comparative example (steel pipe No. 46) where a cooling rate after hot rolling had been performed was more than our preferable range, since the desired microstructure was not achieved due to a base metal portion having a microstructure mainly including a bainite phase, there was a deterioration in resistance to softening for a long period and creep rupture property.

In addition, in the comparative example (steel pipe No. 47) where a holding time in a temperature range of 480° C. to 350° C. after coiling had been performed was less than our preferable range, since the desired microstructure was not achieved due to a base metal portion having a microstructure mainly including a bainite phase, there was a deterioration in resistance to softening for a long period and creep rupture property. In addition, in the comparative example (steel pipe No. 49) where a holding time at a temperature of 480° C. to 350° C. after coiling had been performed was more than our preferable range, there was a deterioration in the resistance to softening for a long period and creep rupture property of the base metal portion. In addition, in the comparative example (steel pipe No. 52) where a cooling rate in a cooling process after the heating of an electric resistance weld zone had been performed was less than our preferable range, since the desired microstructure was not achieved due to an increase in the grain diameter of a microstructure in the electric resistance weld zone, there was a deterioration in resistance to softening for a long period and creep rupture property. In addition, in comparative example (steel pipe No. 56) where a cooling rate in a cooling process after the heating of the electric resistance weld zone had been performed was less than our preferable range, since the desired microstructure was not achieved due to a decrease in the volume percentage of a quasi-polygonal ferrite phase, there was a deterioration in resistance to softening for a long period and creep rupture property.

In addition, in the comparative example (steel pipe No. 50) where a holding time at a temperature of 500° C. to 360° C. in a cooling process after the heating of the electric resistance weld zone had been performed was less than our preferable range, there was a deterioration in resistance to softening for a long period and creep rupture property. In addition, in the comparative example (steel pipe No. 51) where a holding time at a temperature of 500° C. to 360° C. in a cooling process after the heating of the electric resistance weld zone had been performed was more than our preferable range, there was a deterioration in resistance to softening for a long period and creep rupture property.

In addition, in the comparative example (steel pipe No. 37) where the lower limit of a heating temperature when the heating of an electric resistance weld zone was performed was lower than our preferable range, since the desired microstructure was not achieved due to the electric resistance weld zone having a microstructure mainly including a polygonal ferrite phase having a large grain diameter, the desired high strength was not achieved as indicated by a tensile strength TS of the electric resistance weld zone of less than 450 MPa, and there was a deterioration in resistance to softening for a long period and creep rupture property. In addition, in the comparative example (steel pipe No. 41) where the lower limit of a heating temperature when the heating of an electric resistance weld zone was performed was higher than our preferable range, since the desired microstructure for the electric resistance weld zone was not achieved due to the electric resistance weld zone having a microstructure including, in terms of volume percentage, less than 90% of a quasi-polygonal ferrite phase, there was a deterioration in resistance to softening for a long period and creep rupture property.

In addition, in both cases of steel pipe No. 40 (our example) where a taper type groove was formed in the end faces in the width direction of a hot rolled steel sheet (end faces of butt portions) when electric resistance welding was performed and steel pipe No. 39 (our example) where atmospheric control was performed when electric resistance welding was performed, since the total content of Si, Mn, Al, Ca and Cr contained in inclusions having an equivalent circle diameter of 5 µm or more in an electric resistance weld zone was 20 mass ppm or less, which was less than that of the steel pipes which were manufactured without forming a taper type groove or performing atmospheric control, $\Delta$YS became less than 30 MPa, which means that these steel pipes were particularly excellent in terms of resistance to softening for a long period.

The invention claimed is:

1. A high strength electric resistance welded pipe having a longitudinally extending seam of an electric resistance weld zone, a base metal of the pipe having a chemical composition containing, by mass %,
   C: 0.025% or more and 0.084% or less, Si: 0.10% or more and 0.30% or less,
   Mn: 0.70% or more and 1.90% or less, P: 0.018% or less,
   S: 0.0029% or less, Al: 0.01% or more and 0.10% or less,
   Nb: 0.001% or more and 0.070% or less, V: 0.001% or more and 0.065% or less,
   Ti: 0.001% or more and 0.033% or less, Ca: 0.0001% or more and 0.0035% or less,
   N: 0.0050% or less, O: 0.0030% or less
   and the balance being Fe and inevitable impurities, in which a condition that Pcm defined by equation (1) below is 0.20 or less is satisfied, having a microstructure in the base metal portion including, in terms of volume percentage, 90% or more of a quasi-polygonal ferrite phase as a main phase and the balance being hard phases other than the quasi-polygonal ferrite phase in which the quasi-polygonal ferrite phase has an average grain diameter of 10 µm or less, having a microstructure in an electric resistance weld zone including, in terms of volume percentage, 90% or more of a quasi-polygonal ferrite phase as a main phase and the balance being hard phases other than the quasi-polygonal ferrite phase, in which the quasi-polygonal ferrite phase has an average grain diameter of 10 µm or less, and having a yield strength YS of 450 MPa or more:

$$\text{Pcm}=C+Si/30+Mn/20+Cu/20+Ni/60+Cr/20+Mo/15+V/10+5B \quad (1),$$

where C, Si, Mn, Cu, Ni, Cr, Mo, V and B represent the contents (mass %) of chemical elements respectively represented by the corresponding atomic symbols.

2. The high strength electric resistance welded pipe according to claim 1, wherein total content of Si, Mn, Al, Ca and Cr contained in inclusions having an equivalent circle diameter of 5 µm or more present in the electric resistance weld zone is 49 mass ppm or less.

3. The pipe according to claim 1, wherein the chemical composition further contains, by mass %, one or more selected from among Cu: 0.001% or more and 0.350% or less, Ni: 0.001% or more and 0.350% or less, Mo: 0.001% or more and 0.350% or less and Cr: 0.001% or more and 0.350% or less.

4. The high strength electric resistance welded pipe according to claim 3, wherein total content of Si, Mn, Al, Ca and Cr contained in inclusions having an equivalent circle diameter of 5 µm or more present in the electric resistance weld zone is 49 mass ppm or less.

* * * * *